United States Patent [19]

Croxon et al.

[11] 3,786,437

[45] Jan. 15, 1974

[54] RANDOM ACCESS MEMORY SYSTEM UTILIZING AN INVERTING CELL CONCEPT

[75] Inventors: Brian F. Croxon, Peabody; Laurence F. Abbott, Needham, both of Mass.

[73] Assignee: Honeywell Information Systems, Inc., Waltham, Mass.

[22] Filed: Jan. 3, 1972

[21] Appl. No.: 215,976

[52] U.S. Cl. .... 340/173 DR, 340/172.5, 340/173 R

[51] Int. Cl. .... G11c 13/00

[58] Field of Search .... 340/173 R, 172.5, 340/173 DR

[56] References Cited

UNITED STATES PATENTS

| | | | |
|---|---|---|---|
| 3,681,764 | 8/1972 | Conant | 340/173 R |
| 3,421,148 | 1/1969 | Howells | 340/173 R |
| 3,684,897 | 8/1972 | Anderson | 340/173 R |

*Primary Examiner*—Terrell W. Fears
*Attorney*—Faith F. Driscoll et al.

[57] ABSTRACT

A non-destructive read MOS memory system associates a different cell of an additional group of storage cells with a different column grouping of the memory cells of a two dimensional array. Each cell of the additional group stores indications as to the number of times the cell contents of its associated column has been selected during a read or write cycle of operation. Each time a column is selected during a read cycle of operation, the contents of all of the cells of a selected column are inverted and written back into the cell automatically refreshing the column cells. To provide read out of the correct information to an utilization device a signal representative of the content of the selected cell within a column is logically combined with a signal representative of the state of its associated status cell. Similarly, to ensure that the correct data is written into a selected cell, the input data signals from the utilization device are logically combined with signals representative of the state of the status cell associated with the column.

39 Claims, 7 Drawing Figures

RANDOM ACCESS MEMORY SYSTEM UTILIZING AN INVERTING CELL CONCEPT

BACKGROUND OF THE INVENTION

1. Field of Use

This invention relates to two dimensional memory array systems of integrated circuit construction. More particularly, the invention relates to an improved MOS memory system.

2. Prior Art

It has become well known in the present state of the art to utilize field effect transistors as memory units. Such units have been used to construct high speed scratch pad memories as well as small buffer or cache memory systems. More recently, developments in the semiconductor memory technology have prompted consideration of using such devices to construct the computer main frame memories. The type of random-access memory systems which have been developed are described in an article titled "Semi-conductor Random-Access Memories" by L. L. Vadaz, H. T. Chua, A. S. Grove, published in IEEE Spectrum, May, 1971.

One approach taken in prior art memory systems has been to utilize storage devices wherein field effect transistors are connected in a flip-flop or latching arrangement. It has been found that such arrangements normally necessitate a large number of active devices in each cell and require a relatively large area on the integrated circuit substrate. Also, such arrangements limit the number of cells which can be built on a single substrate. Additionally, bistable flip-flop storage elements normally dissipate too much power, limiting the number of bits that can be concentrated into a module.

To overcome the shortcomings of the flip-flop or latch type device, other prior art systems utilize a three transistor memory cell such as the cell described in pages 182–186 of the publication titled "Three-Transistor Cell 1024-Bit 500 MOS RAM" by W. M. Regitz and J. A. Karp, published by IEEE Journal Solid State Circuits Volume SC-5, On October, 1970. In the system disclosed by the article, as well as other prior art systems, information is maintained by the three transistor cell by charge storage only. Accordingly, a characteristic feature of such prior art is that semiconductor memories of this type sometimes described as being volatile require periodic refreshing of the charge stored in their cells. The prior art systems accomplish periodic refreshing by providing a refresh amplifier for each column of the memory array.

One major disadvantage of the conventional refreshed prior art systems is that the aforementioned regeneration process necessitates an increased number of devices to be associated with the memory. Moreover, these devices normally dissipate considerable power and consequentially require a large portion of the substrate surface area. Accordingly, these systems limit greatly the number of bits that can be concentrated into a single module.

Other disadvantages of a first type of prior art refreshed systems is that they require separate refresh command signals and place restrictions on the voltage levels of certain data input signals during refresh operations.

Another disadvantage of another type of refreshed prior art system is slower read access time. More specifically, because the action of reading out the content of the three transistor cells normally produces the complement of the cell content as an output, the content of the cell selected must be sensed, inverted, and amplified by the refresh amplifier circuit associated with the cell column and thereafter re-written back to the same cell during each read cycle of operation. Because of the considerable time expended in performing the foregoing operations, normally either a portion of the same memory cycle or another memory cycle is required to perform the operation for restoring the information to the cell. This can result in an overall increase in the "read access" time of the memory system. It will be appreciated that the term "read access" time as used herein corresponds to the time interval between the instant a memory cycle is initiated in response to a request for a transfer of information to or from the memory system by a processing unit or control unit and the instant the information is available from the memory system. It will be appreciated of course that the read access time of all locations within the memory system may vary due to the differences in physical location within the system.

Another disadvantage of the above mentioned refresh prior art systems is that the memory system dissipates considerable power. Normally, during the performance of each read operation, the capacitance associated with an addressed row of the memory array is discharged and charged in the process of reading and then restoring the information read from a selected cell within the memory array. Accordingly, considerable power is dissipated during each read-restore cycle of operation.

Therefore, it is an object of the present invention to provide an improved technique for constructing an integrated memory system.

It is a further object of the present invention to provide an arrangement which decreases greatly the power dissipated by the memory system.

It is still a further object of the present invention to provide an arrangement which increases the speed and reduces the "read access" time of the system by providing for a shortened read cycle of operation.

It is a more specific object of the present invention to provide a technique for increasing the density of an integrated circuit MOS memory system by obviating the need for refresh amplifier driver circuits.

It is still a more specific object of the present invention to provide a low cost integrated circuit two dimensional MOS field effect transistor memory array.

SUMMARY OF THE INVENTION

The foregoing objects are achieved in a preferred embodiment of the present invention which utilizes the "inverting" or complementing characteristic of the results of an interrogation operation performed on selected cells of a plurality of memory cells arranged in rows and columns to form a memory array to eliminate the need for following such interrogation operation with a further cycle for performing a write operation in which the sensed content of an interrogated cell is inverted and written back into the cell.

More particularly, the invention associates at least one storage cell with a different plurality of memory cells constituting a column of the memory array for storing status information as to the number of times that the cells of a particular column have been selected and their contents complemented. During one or a read interval of each memory cycle of operation, the complement of the content of each of the cells of an addressed column is applied to an input/output bus associated with the row in which the cell is located.

Immediately thereafter the complement of the information read is written into each of the cells during another or a write interval of the same cycle. The complement of the content of the status storage cell associated with the selected column is also read out during the first interval and written back into the status cell during the second interval so as to maintain a modulo two count of the number of times the column has been selected.

Accordingly, the content of each cell of a selected column and its associated status storage cell change at each read cycle of operation with the information stored in cells of the column being freshened automatically. Stated differently, during each memory cycle, the information contents of the cells of a selected column are inverted and refreshed. Thus, this arrangement provides for automatic freshening of the cells of a column while also eliminating the need for refresh amplifier circuits which consume a large portion of the substrate surface area. Hence, the invention increases significantly the number of bits which can be concentrated into a single memory module or chip.

To ensure that the correct data content is always read out to a utilization device from a selected cell of a column and the correct data content from the utilization device is written into the selected cell, signals representative of the state of the status cell associated with the column in which the cell is located are combined logically with both signals representative of the selected cell content read out and input data to be written therein respectively. In the preferred embodiment, the logical combining of signals for read and write operations takes the form of an exclusive OR operation.

The arrangement of the invention reduces significantly the power dissipation of the storage array over a given interval of time during normal operation by reducing the number of times the capacitance associated with each of the digit/sense lines of the array is discharged and charged. That is, by complementing the contents of the cells of selected columns in accordance with the invention during each read cycle of operation, the probability of having to discharge and charge the capacitances of the digit/sense lines of an array during a number of cycles is only one half of the number of cycles the digit/sense line capacitances of a conventional storage array are charged and discharged. Since the power dissipated by an array is directly proportional to the number of times selected cells are charged and discharged during each read cycle of operation, the invention produces reduction in the average power dissipated by the array of one half. It will also be appreciated by those skilled in the art that the invention also produces a decrease in the average power dissipated by the array during write cycles of operation.

Additionally, the invention reduces the overallaccess time of the memory system. In particular, because the memory store control apparatus which communicates requests to the memory system from a utilization unit or units normally stores control information defining the type of memory request, the decrease in cycle time provided by the arrangement of the invention permits the memory controller/unit to initiate action sooner for other requests thereby decreasing the access time of the memory system. In fact in the case of a read operation, the memory store controller is able to shorten the cycle time of a read operation still further by inhibiting the time interval allocated to freshening the contents of the cell and initiating action for another cycle as soon as the read out of data is completed. Accordingly, the shortening of the cycle time in each instance increases significantly the number of memory accesses which can be made within a given time interval.

The invention further increases the bit density of a memory module as well as facilitating its fabrication by having both the status or control cells associated with each column and the cells of the array of like construction. More particularly, in the illustrated embodiment each cell and status cell includes three transistors, an input transistor, an output transistor and a storage transistor. The input and output transistors of each cell isolate the "storage" transistor from the digit/sense line or I/O bus that connects the input/output terminals of the cells of each row of the memory array. The input transistor or "write" transistor is operative to control the placement of a charge across the gate to substrate or gate to source capacitance (termed herein storage node) of the storage transistor during a write cycle. The output or "read" transistor connects in series with the storage transistor for sensing the charge condition of the storage node or parasitic capacitance of the storage transistor during a read cycle.

The above and other objects of this invention are achieved in an illustrative embodiment described hereinafter. Novel features which are believed to be characteristic of the invention both as to its organization and method of operation, together with further objects and advantages thereof will be better understood from the following description considered in connection with the accompanying drawings. It is to be expressly understood however, that these drawings are for the purpose of illustration and description only and are not intended as a definition of the limits of the present invention.

DESCRIPTION OF ILLUSTRATIVE EMBODIMENT

Figure 1:
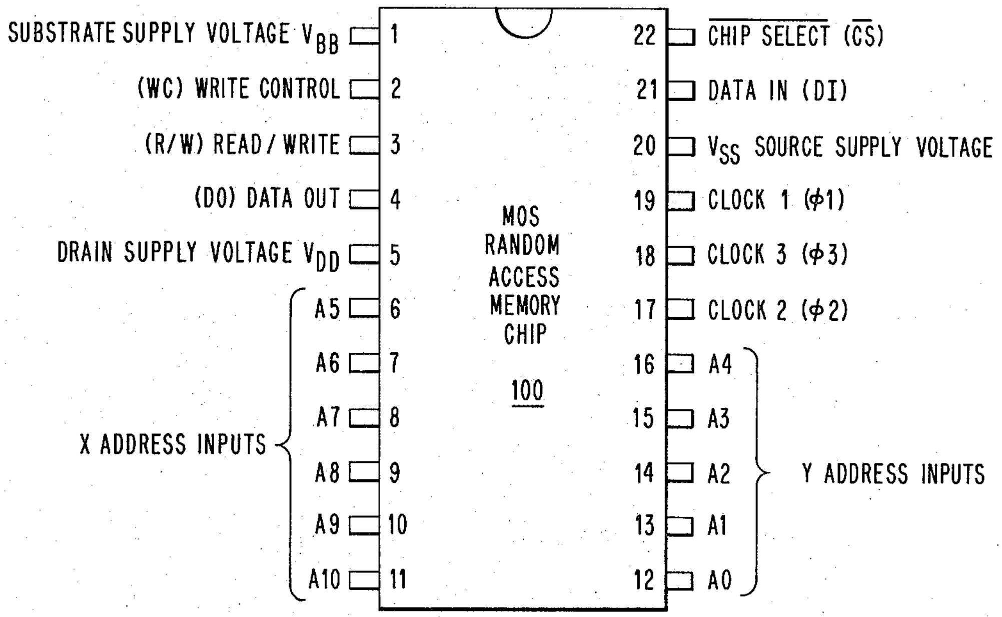
FIG. 1 is a pictorial representation of the memory chip built in accordance with the principles of the present invention.

FIG. 1 shows in pictorial form the various input and output pin connections of the memory module package which includes the memory system of the present invention fabricated on a single integrated circuit substrate or chip. As shown, the chip has twenty-two pin connections including pins for receiving substrate, source, and drain supply voltages labeled the $V_{BB}$, $V_{SS}$ and $V_{DD}$, respectively.

Additionally, the chip receives a chip select signal, $\overline{CS}$, via another pin connection and this signal when at ground potential indicates that the memory module or chip is "selected" for access. When the signal, $\overline{CS}$, is at 3 volts, access to the memory chip is inhibited.

Two sets of pin connections receive the row address signals A5 through A10 and column address signals A0 through A4, respectively. The various operations performed by the memory chip is timed by the input timing signals 01, 02 and 03 applied to three separate pins as shown. The signals applied thereto are derived from an external three phase clock network, conventional in design and are of an amplitude suitable for driving MOS devices. The information or data to be written into a selected bit location within the memory chip is applied to a pin connection labeled D1 and the information read out from the memory chip is applied to a pin connection labeled DO. The chip also receives a write command control signal WC and read/write command control signal R/W, respectively via two pin connections as shown. The command signal R/W designates what type of operation the chip is to perform. For example, when the signal R/W is forced to a voltage level representative of a binary ONE (i.e., 3 volts), the chip performs a write operation and when the signal R/W is forced to a voltage level representative of a binary ZERO (i.e., zero volts), the chip performs a read operation. The write command control signal WC is derived from the inversion or complement of the data signal applied to pin DI. The duration of the assertion and negation of the data signal is established by timing of strobe signals external to the chip.

In the preferred embodiment of the present invention, the memory chip utilizes active devices constructed of metal oxide semiconductor (MOS) insulated gate field effect transistors herein referred to as MOS devices or transistors. It will be apparent that the chip may also utilize other types of MOS devices as well.

As well known in the art, the MOS devices are fabricated on a single P type or N type silicon substrate with each of the MOS devices having a gate or control region, a drain region and a source region herein referred to as gate (control), drain, and source electrodes. For the purposes of the present invention, the source and drain electrodes can be regarded as being interchangeable.

The insulated gate field effect transistors may be either the enhancement type or the depletion type. However, the preferred embodiment utilizes P channel enhancement type MOS FETs fabricated on an N type substrate as described herein in greater detail in connection with FIG. 5. The enhancement type MOS device has been selected primarily for minimizing power in that the conductivity through the conduction path of the MOS device is characteristically low and hence only a small leakage current flows between the source and drain regions when the gate and source electrodes are at the same voltage.

In the illustrated embodiment, internal to the chip a voltage level representative of a binary ONE and a binary ZERO respectively corresponds to the drain supply $V_{DD}$ of −15 volts and the source supply voltage $V_{SS}$ of +5 volts. Considering the operation of the P channel MOS transistor briefly, it will be noted that the majority carriers or holes flow from the source to srain electrodes (i.e., has a high conductivity conduction path) when the voltage applied to the gate electrode of the MOS device is negative relative to the voltage applied to the source electrode (i.e., a binary ONE). Conversely, when the voltage applied to the gate electrode of the P channel MOS device is negative relative to the voltage applied to the source electrode by an amount less than the threshold voltage of the device (i.e., voltage between gate and source electrodes), then the device is nonconductive as in the instance of a binary ZERO being applied thereto. As well known to those skilled in the art, the threshold voltage normally corresponds to a voltage between 1.5 to 2.5 volts. It will be appreciated that the above description is also indicative of the operation of N channel MOS devices using opposite polarity voltages.

DESCRIPTION OF FIGURE 2

Figure 2:
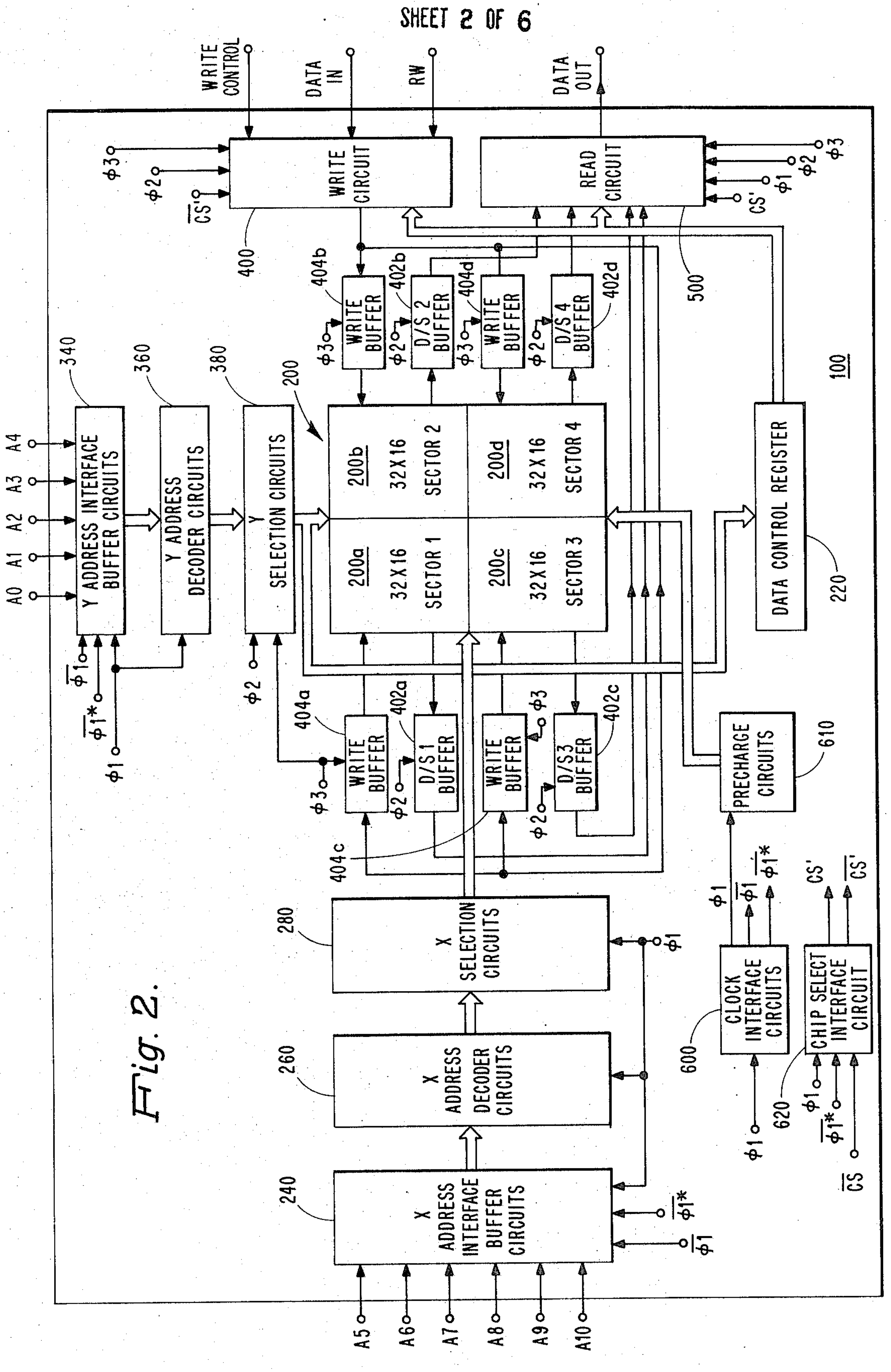
FIG. 2 illustrates in block form the interconnections of the various sections of memory chip of FIG. 1.

The basic organization of the memory chip of FIG. 1 is illustrated in FIG. 2. In general, the chip includes a 2048 word by one bit memory array which is arranged into four sectors or segments labeled *a* through *d*, each sector including a 32 by 16 array of 512 memory cells. It will be appreciated that any smaller or larger number of memory cells could be shown in illustrating the principles of the present invention, as will become clear from the explanation herein to follow. It will also be clear to those skilled in the art that the memory chip of the present invention can be combined with other chips to form various types of memory organizations. For example, a number of the memory chips or modules may be grouped together to form a word organized memory system.

Referring to FIG. 2 in greater detail, it will be noted that the major portions of the memory chip or module 100 include the four segments or sector arrays of memory storage cells represented by the block 200, a data control register including status storage cells and associated circuits represented by the block 220, X address interface, decoder and selection circuits represented by the blocks 240, 260 and 280 respectively, Y address interface, decoder and selection circuits represented by blocks 340, 360 and 380, a Write Circuit represented by block 400 and a Read Circuit represented by block 500. Additionally, the chip 100 includes read buffer circuits represented by blocks 402*a*, *b*, *c* and *d* and write buffer circuits represented by blocks 404*a*, *b*, *c* and *d*. These circuits supply the necessary drive currents and provide the requisite isolation between the read and write circuits of blocks 500 and 400 within their respective sectors.

The module 100 applies the chip select signal, $\overline{CS}$ and timing signals 01, 02 and 03 as inputs to the various portions of the module including a chip select interface buffer circuit, clock interface circuits and precharge circuits represented respectively by blocks 620 and 600 and 610. The block 620 converts the input signal $\overline{CS}$ applied thereto into a pair of complementary signals CS' and $\overline{CS'}$ applies them to the blocks 500 and 400 of the module for enabling read and write operations to be performed by the memory module. The block 600 generates additional overlapping clocking signals $\overline{\phi 1}$ and $\phi 1^*$ from clocking signal $\phi 1$ for timing the operations of blocks 240, 340, and 620 as described herein.

Figure 3A:
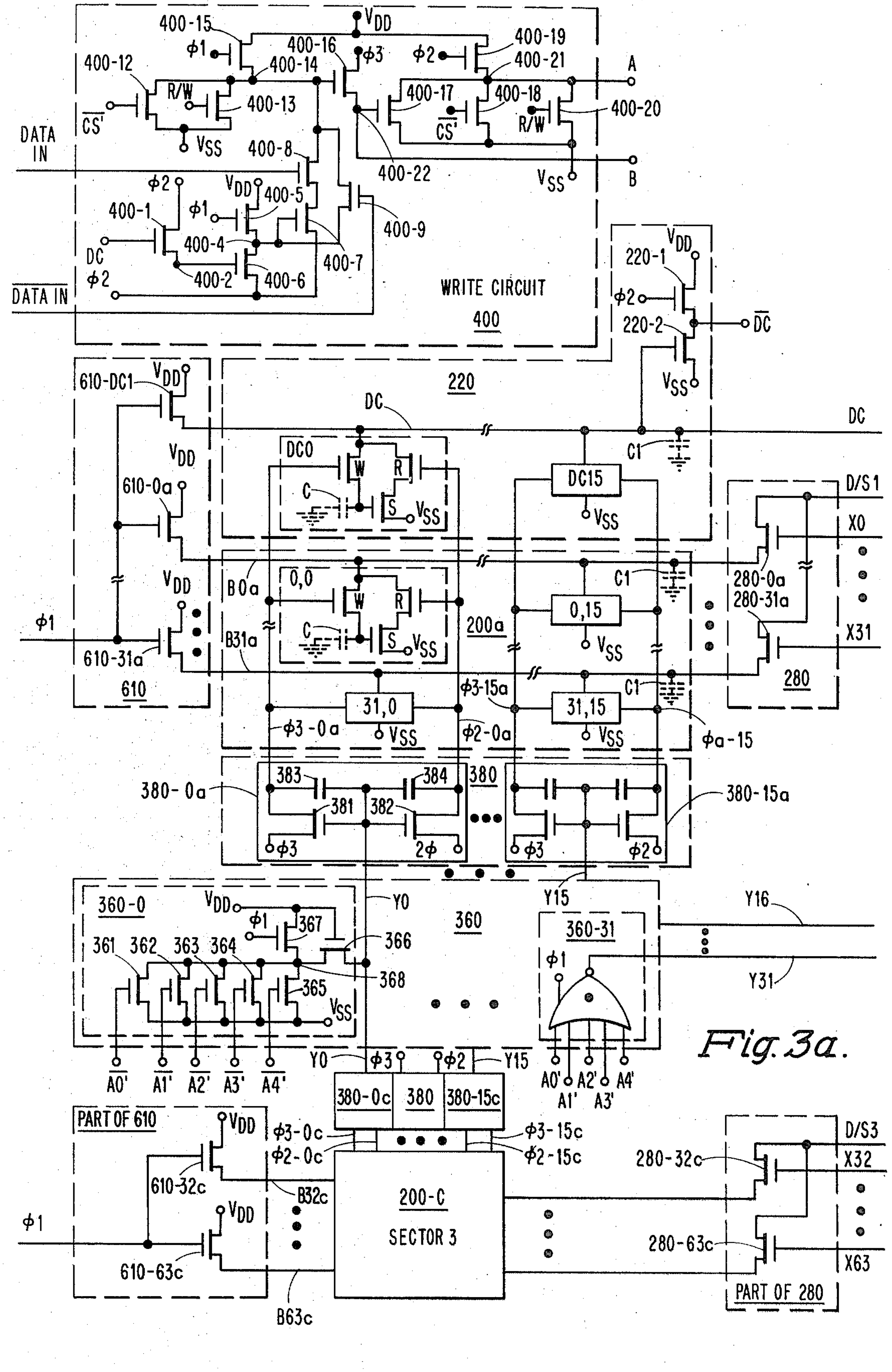
FIGS. 3*a*, 3*b* and 3*c* illustrate in greater detail the sections of the memory chip of FIG. 2.
Figure 3B:
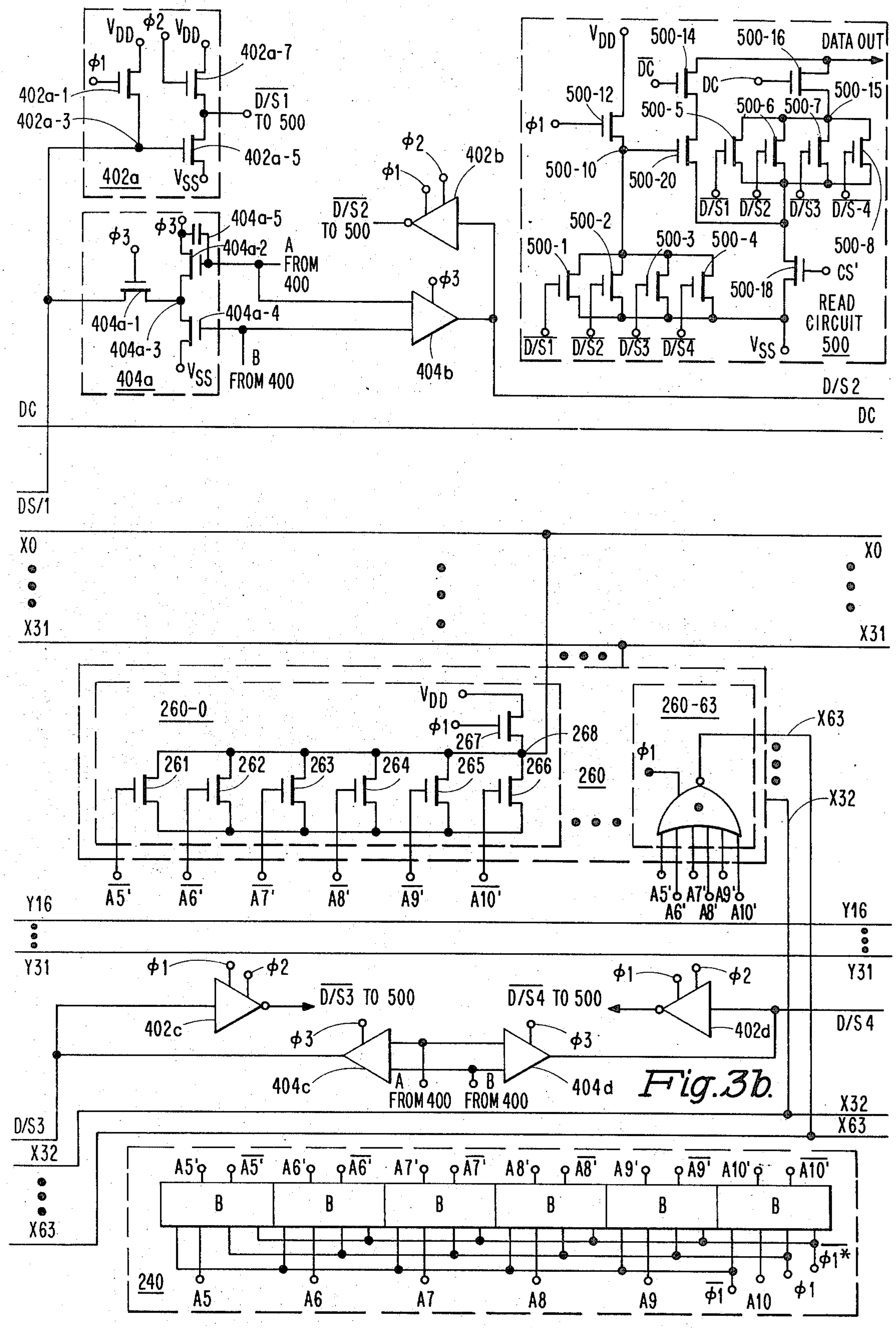
Figure 3C:
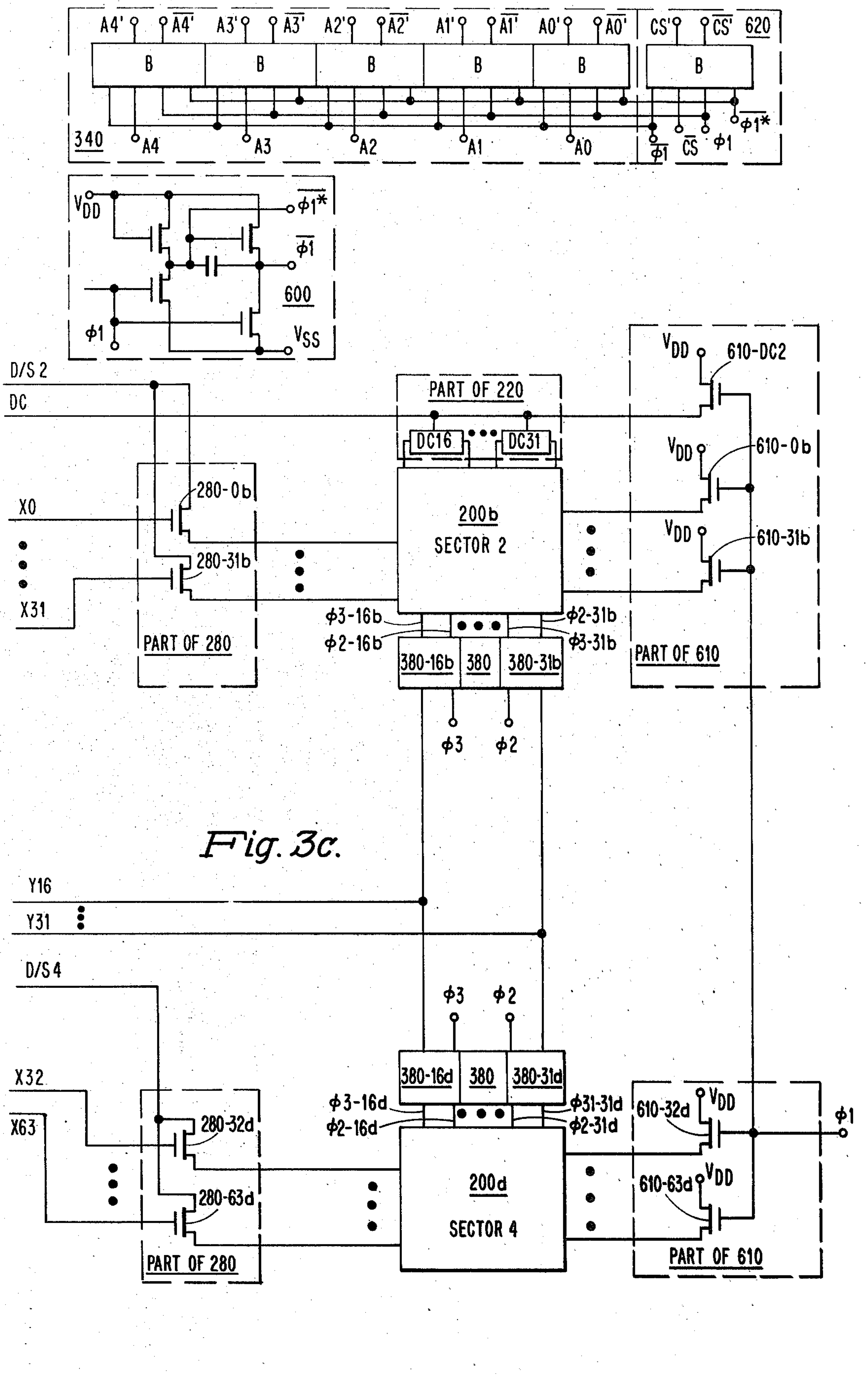

DESCRIPTION OF FIGS. 3*a*, 3*b* and 3*c*

The blocks on FIG. 2 are illustrated in greater detail in FIGS. 3*a* through 3*c*. Referring to FIGS. 3*a*–3*c*, it will be seen that the array 200 has the three transistor storage cells arranged into four sectors 200*a* through 200*d*, each sector or segment arranged in a rectangular matrix configuration which has 32 rows and 16 columns with a different one of the 512 memory cells being positioned at each row and column intersection. As indicated previously, since it is only necessary to consider the operation of a single segment or portion thereof to illustrate the principles of the present invention only the circuits of a single sector are shown in detail in FIGS. 3*a*–3*c*.

DATA CONTROL SECTION

In FIGS. 3*a* through 3*c*, it is seen that the control register 220 includes an additional group of storage cells referenced as DC0 through DC31 which are arranged to form another row of the array 100 so that each of the control register cells is associated with a different column of the array.

SECTOR ORGANIZATION

The 16 cells of each of the rows of each sector connect in common to a different one of a plurality of digit/sense or input/output lines. That is, the 16 cells of the rows of sector 1, sector 2, sector 3 and sector 4 connect to different ones of the input/output lines or buses labeled BO*a* through B31*a*, BOb through B31*b*, B32*c* through B63*c* and B32*d* through B63*d* as shown in FIGS. 3*a* through 3*c*. The input/output lines of each sector are connected to one of four common digit/-sense lines D/S1 through D/S4 through the drain electrode of their respective transistors within the groups of select transistors **280-O*a* through 280-31*a*, 280-0*b* through 280-31*b*, 280-63*c* and 280-32*d* through 280-63*d***.

The input/output terminal of each of the 32 cells of the data control register 220 connect in common to a digit/sense line labeled DC in FIG. 3*a*. The capacitance associated with each of the digit/sense lines is precharged to a negative potential upon application of the clocking signal 01 via a different one of a plurality of transistors 612-DC1, **6120*a* through 612-31*a* included within block 610. The capacitance of each of the digit/-sense lines of the remaining sectors are arranged to be precharged in a similar fashion upon the application of clocking signal 01 to the remaining transistors labeled 612-DC2, 612-0*b* through 612-31*b*, 612-32*c* through 612-63*c* and 612-32*d* through 612-63*d* of block 610.**

The cells of each of the columns of sector 1 are enabled to have their contents read and their contents modified upon application of clocking signals 02 and 03 respectively applied to clocking buses **02-O*a*, 03-0*a* through 0-152, 03-15*a* by selectively enabled column or Y select circuits 380-0 through 380-15. The cells included with each of the remaining sectors 200*b*, 200*c* and 200*d* are arranged in a coordinate relationship equivalent to that of sector 1 for applying selectively clocking signals 02 and 03** via the clocking buses and Y select circuits as shown. The various elements of these sectors are labeled in FIGS. 3*a*, 3*b* and 3*c* with reference numerals similar to sector 1 together with their appropriate sector letter designations (i.e., *b*, *c* and *d* for sectors 2, 3 and 4 respectively).

DECODER AND SELECTION CIRCUITS

In the above coordinate sector arrangement, a particular emory cell designed by a combination of address signals AO through A10 applied to the X and Y buffer interface circuits 240 and 340 is addressed by the combinations of binary signals applied to the X and Y address X decoder circuits 260 and 360. A particular row of one of the sectors is selected through a particular one of the X selection circuits 280 which is designated by the address signals applied to the X interface circuits 240 to the address decoder circuits 260. The selection of a memory cell within the sector is completed by applying clocking signals 02 and 03 through a particular one of the Y selection circuits 380 designated by the address signals applied by the Y interface circuits 340 to the Y address decoder circuits 360. In greater detail, the 2048 storage cells arranged as an array of 64 rows and 32 columns are selected by activating a particular one of the 64 multi-input row decoder gates 260-0 through 260-63 and a particular one of the 32 multi-input column decoder gates 360-0 through 360-31 in FIGS. 3*a* through 3*c*. Each of the row decoder gates 260-0 through 260-3 as shown in FIG. 3*b* includes a dynamic NOR gate including a plurality of input MOS devices 261 through 266 arranged to receive a different combination of binary input address signals A5 through A10. That is, the NOR gate 260-0 receives binary signals A5′ through A10′ and the NOR gate 260-63 receives the complements of binary signals A5′ through A10′ designated as $\overline{A5'}$ through $\overline{A10'}$. The remaining NOR gates receive the other remaining combinations of binary signals A5′ through A10′ and $\overline{A5'}$ and $\overline{A10'}$. Additionally, each of the NOR gates includes a MOS device 267 which is arranged to receive clocking signal 01 for charging the node capacitance of a storage node 268.

Similarly, each of the column decoder gates 360-0 through 360-31 includes a dynamic NOR gate including a plurality of MOS transistors 361-365 which are arranged to receive a different combination of binary input address signals A0 through A4. That is, the NOR gate 360-1 receives binary signals $\overline{A0'}$ through $\overline{A4'}$and the NOR gate 360-31 receives the signals A0′ through A4′. The remaining NOR gates receive other combinations of binary signals A0′ through $\overline{A4'}$ and $\overline{A0'}$ through A4′. Also, each column NOR gate includes a MOS device 367 which receives the clocking signal 01 for charging a storage node 368 and an output MOS device 366 which couples the output to lines Y0 through Y32.

As illustrated in FIGS. 3b and 3C, the pairs of complementary address signals A0′, $\overline{A0'}$ through A4′, $\overline{A4'}$ and A5′, $\overline{A5'}$ through A10′, A10′ are provided by buffer interface circuits 340-0 through 340-4 and 240-5 through 240-10 respectively. The buffer circuits for the purpose of the present invention can be considered conventional in design and comprise well known inverter circuits which are arranged to produce the complements of the input address signals. However, in a preferred embodiment, the buffer circuits can take the form of the driver circuits disclosed in the copending application titled "Memory Selection Apparatus including Isolation Circuits" bearing Ser. No. 214,771 invented by Brian F. Croxon, assigned to same assignee named herein and filed on even date herewith.

As shown in FIG. 3a, the row decoder gates 260-0 through 260-31 when selected apply their outputs via lines X1 through X31 to the gate or control electrodes of corresponding ones of the row selection transistors **280-0*a* through 280-31*a*, and 280-0*b* through 280-31*b*. Similarly, row decoder gates 260-32 through 260-63 when selected apply their outputs via the lines X32 through X63 to the gate or control electrodes of corresponding ones of the row selection transistors 280-32***c* through 280-63*c* and 280-32*d* through 280-63*d*.

Additionally, as shown in FIG. 3a, the column decoder gates 360-0 through 360-15 when selected apply their outputs via the lines Y0 through Y15 to a corresponding number of column select transistor circuits 380-0*a* through 380-15*a* and 380-0*c* through 380-15*c*. Similarly, the remaining column decoder gates 360-16 through 360-31 when selected apply their outputs via lines Y16 through Y31 to a corresponding one of a number of column select transistor circuits 380-16*b* through 380-31*b* and 380-16*d* through 380-31d. Each column select circuit is constructed to include a pair of MOS devices 381 with associated "bootstrapping capacitors" 383 and 384 arranged as shown in FIG. 3a.

OPERATION OF CIRCUITS 240, 260, AND 340, 360

The operation of the X and Y interface and address decoder circuits will be now considered as is necessary to an understanding of the present invention. During the timing interval defined by clocking signal 01, herein referred to as a "precharge interval," all of the row decoder circuits and the column decoder circuits condition transistors corresponding to transistors 367 and 267 respectively to charge storage nodes 368 and 268 to a negative voltage. Also during this interval, bootstrap capacitors 383 and 384 of each of the column decoder circuits and the capacitance associated therewith are charged to a negative voltage. At this time, all binary address signals are at voltage level representative of binary ZERO (i.e., a voltage level approximately equal to Vss). Accordingly, all of the row decoder gate transistors 361 through 365 and all of the column decoder gate transistors 261 through 365 during this time interval, are nonconductive.

At the end of the timing interval defined by $\phi 1$, the row and column interface circuits 240 and 340 in response to clocking signals $\overline{\phi 1}$ are operative to apply the previous sampled combination of address signals to the X and Y decoder circuits 260 and 360 which causes at least one of the gate transistors 261 through 265 in all but the selected one of the two decoder circuits and at least one of the gate transistors 361 through 365 in all but the selected one of the column decoder circuits to be switched into conduction. When one of MOS devices corresponding to one of transistors 261 through 266 and one of the transistors 361 through 365 respectively switches on in each of the "unselected" row and column decoder gates, the storage nodes 268 and 368 as well as bootstrap capacitors 383 and 384, and the capacitances associated therewith are discharged rapidly through the conductive MOS device and through MOS device 366 toward the voltage Vss. This in turn conditions each of the selection transistors associated with the unselected gates to be nonconductive.

In the case of the "selected" column decoder gate, the MOS device corresponding to transistor 366 switches to a non-conductive state when its source electrode is forced negative thereby maintaining its bootstrap capacitance charged negatively. Similarly, the MOS devices corresponding to transistors 361 through 365 of the "selected" row decoder gate by remaining non-conductive maintain storage node 368 negatively charged. Accordingly, only the "selected" row and column decoder gates have their storage modes charged negatively which in turn enable the appropriate outputs to be applied to one of the lines X0 through X63 and to one of the lines Y0 through Y31. All of the other lines remain at the voltage Vss representative of an unselected state.

OPERATION OF CIRCUITS 280 AND 380 AND MEMORY CELLS

The operation of the X and Y selection circuits 280 and 380 will now be described relative to the selection of a memory cell. As previously indicated, during the precharge interval defined by clocking signal 01, the capacitance associated with each of the digit/sense buses represented by capacitors C1 in FIG. 3*a* is charged to a negative potential (e.g. −11 volts). Upon the termination of clocking signal 01, only the "selected" row and column selection lines which define the location of the selected memory cell 10 condition their respective row and column selection circuits with a negative voltage.

As previously mentioned, each memory cell includes an input MOS transistor W, an output MOS transistor R and a storage MOS transistor S which is arranged to store information in the form of a charge across the gate to substrate or across the so-called parasitic or inherent capacitance, labeled C in FIG. 3*a* which has been previously termed a storage node. During the time interval defined by clocking signal 02, the transistor 382 of the column selection circuit associated with the "selected" column decoder gate applies a negative voltage representative of a binary ONE (i.e., −13 volts) to one of the 02 lines associated therewith which switches the output MOS transistor, R, of each of the memory cells within the column to a conductive state.

If a voltage representative of a binary ONE (i.e., a voltage greater than −5 volts) is stored on parasitic capacitor C of the selected memory cell, then storage transistor S is switched on which causes the capacitance, C1, of the digit/sense line to discharge through a path provided by series coupled transistors R and S to the voltage Vss. If the storage transistor S stores a voltage representative of a binary ZERO (i.e., voltage less than −5 volts), then transistor S remains nonconductive inhibiting the discharge of capacitance C1 and the digit/sense line remains at the same negative voltage level (i.e., −13 volts).

From the foregoing, it is seen that the memory cell when interrogated produces an amplified signal which is the inversion of the data signal level stored by node capacitor C. The signal is regarded as being amplified since the binary ONE and binary ZERO signal levels are independent of the data signal level stored by node capacitor C.

The data signal level which is to be stored by the node capacitor of the selected memory cell is determined during the time interval defined by clocking signal 03. More particularly, during the time interval defined by clocking signal 03, transistor 381 of the column select circuit associated with the "selected" column decoder gate applies a negative voltage representative of a binary ONE (i.e., −13 volts) to one of the 03 lines associated therewith which switches the input MOS transistor W of each of the memory cells within the column to a conductive state.

The transistor W provides a path for charging or discharging capacitor C to the voltage applied to the digit/sense line. If the voltage applied to the digit/sense line is representative of a binary ONE (i.e., −13 volts), capacitor C is charged negatively to store a binary ONE (i.e., −13 volts). If the voltage applied to the digit/sense line is representative of a binary ZERO (i.e., +5 volts), capacitor C is discharged to store a binary ZERO (i.e., less than −5 volts). Since the capacitance C1 of the line is arranged to be much greater than the capacitance of C, voltage less than those indicated are sufficient to charge or discharge capacitor C to an appropriate value of voltage for maintaining storage transistor S in an appropriate state defined by the direction of the charge. It will be appreciated that the charge across the capacitor C is maintained for a long period of time relative to the cycle time of the memory. Thus, even though the capacitor C dissipates the charge stored thereacross, the charge will be maintained for almost the entire operation time of the memory unit.

More importantly, as will become more apparent later, the arrangement of the invention provides for automatic freshening of the memory cells of an column during a normal addressing operation (i.e., a read or write cycle of operation). Accordingly, where each of the columns of the memory chip are arranged to be addressed sequentially during normal memory operation, no additional circuits are required for freshening the dynamic cells of the memory. However, assuming that memory cells are accessed in a random fashion, external circuits conventional in design (e.g., a counter arranged to address each of the columns in sequence) would be normally associated with the chip and arranged to freshen the cells of each column of the memory within a predetermined period of time during a number of successive read cycles of operation. In practice, it has been found desirable to freshen the memory approximately every 2 milliseconds in which instance with a cycle time of 800 nanoseconds the freshening operation corresponds to less than 2 percent of the memory cycle time thereby allowing more than 98 percent utilization of the total memory time for performing read and write operations.

Before describing the operation of the memory chip in accordance with the present invention, the Read and Write circuits of FIGS. 3*a* through 3*c* will be described briefly relative to a selected memory cell.

In general, the Read circuit 500 and Write circuit 500 when enabled to Chip Select circuit 620 are arranged to logically combine the signals representative of the state of data control cells with signals representative of the contents of a selected memory cell and signals representative of new information to be written into the selected memory cell respectively. The logical operations performed by the Read circuit 500 and Write circuit 400 respectively ensures that signals representative of the correct data content stored in the selected memory cell is transferred to the utilization device and that signals representative of the correct new data from the utilization device are stored in the selected memory cell. These operations will now be considered in further detail.

READ CIRCUIT 500

The Read circuit 500 is coupled to each of the Read buffer circuits 402*a* through 402*d* which connect to the common digit/sense lines D/S1 through D/S4 respectively.

During the timing interval defined by clocking signal 02 of a read cycle of operation, the complement of the data contents of the selected memory cell is applied to one of the input/output lines and through one of the select transistors 280 to one of the common digit/sense lines D/S1 through D/S4 connected to buffer circuit 402 of the sector in which the selected cell is located.

In FIG. 3*b*, the clocked Read Buffer Inverter circuit 402 associated with the sector is arranged to charge storage node 402*a*-3 negatively via transistor 402*a*-1 during the time interval defined by clocking signal 01. This causes transistor 402*a*-5 to be conductive forcing one of the lines D/S1 through D/S4 to a voltage representative of a binary ZERO (i.e., Vss or +5 volts). During the time interval defined by clocking signal 02, storage node 402*a*-3 remains charged if a voltage representative of a ONE is applied to the circuit 402 thereby maintaining one of the output lines $\overline{D/S1}$ through $\overline{D/S4}$ at a binary ZERO. If a voltage representative of a ZERO is applied to the circuit 402, storage node 402*a*-3 is discharged toward Vss switching transistor 402*a*-5 off and permitting transistor 402*a*-7 to force the one of the output lines $\overline{D/S1}$ through $\overline{D/S4}$ to a voltage representative of a binary ONE (i.e., −11 volts).

The binary ONE or binary ZERO voltage level from each of the buffer circuits 402*a* through 402*d* of sectors 1 through 4 is applied to Read Circuit 500 via a corresponding one of four lines D/S1 through D/S4. Additionally, one of the outputs of the Chip Select circuit 620 is applied as a further input to Read Circuit 500 to inhibit a direct current path from the DATA OUT line to the supply voltage Vss via a MOS transistor 500-18 when the chip is "unselected." During the time interval defined by clocking signal 01, all of the digit/sense inverter circuits 402*a* through 402*d* discharge all of the lines D/S1 through D/S4 by forcing them to binary ZEROS (i.e., Vss). The two sets of four transistors 500-1 through 500-4 and 500-5 through 500-8 are in turn rendered nonconductive which enables Read Circuit transistor 500-12 to charge storage node 500-10 negatively to a binary ONE (i.e., −11 volts) during time 01. Additionally, during time 01, the line DC is charged negatively to a binary ONE (i.e., −11 volts) in turn switching an inverter transistor 220-2 of FIG. 2*a* into conduction thereby forcing line DC to a binary ZERO (i.e., Vss). This in turn switches Read Circuit transistor 500-14 off. Accordingly, there is no direct current path between the DATA OUT line and supply Vss and the Read Circuit 500 supplies no current to a converter or sensing circuit located externally to the chip.

During time 02, the line DC and one of the lines D/S1 through D/S4, called D/S, are forced to a binary ONE or binary ZERO. Stated differently, the capacitances C1 associated with the lines DC and D/S are conditionally discharged through inverter transistors 220-1 and 402*a*-7 respectively to voltage Vss in accordance with the state of the selected memory cell. The remaining ones of the lines D/S1 through D/S4 remain charged rendering certain ones of the transistors 500-1 through 500-4 and 500-4 through 500-8 nonconductive. Accordingly, storage node 500-10 assumes the state of the selected line D/S such that if line D/S remains charged (i.e., a binary ONE), line $\overline{D/S}$ remains discharged (i.e., a binary ONE) and node 500-10 remains charged. If line D/S discharges (i.e., forced to a binary ZERO), line $\overline{D/S}$ charges (i.e., to a binary ONE) which discharges storage node 500-10 to Vss (i.e., to a binary ZERO).

When the contents of both the lines DC and D/S are the same, then lines $\overline{DC}$ and $\overline{D/S}$ are in the same state and there is no direct current path from line DATA OUT to the voltage source Vss via transistor 500-18. If however, the lines DC and D/S assume opposite states, node 500-10 assumes the state of line D/S while node 500-15 assumes the state of line DC thereby providing a direct current path from the line DATA OUT to Vss via transistor 500-18 through the transistors 500-14 and 500-20 or through the transistor 500-16 and one of the transistors 500-5 through 500-8.

Accordingly, during the interval defined by clocking signal 02 the Read Circuit 500 is seen to perform a logical comparison operation in the form of an exclusive or operation upon the binary signals applied to line DC and a selected one of the lines D/S1 through D/S4. The truth table for the logical operation performed by the Read Circuit 500 is as follows:

READ OPERATION

| line $\overline{D/S}$ Data Stored in Cell | line $\overline{DC}$ Data in Data Control Cell | Data Out |
|---|---|---|
| 0 | 0 | 0 |
| 1 | 0 | 1 |
| 0 | 1 | 1 |
| 1 | 1 | 0 |

It will be appreciated from the table that the binary ONE and binary ZERO representations of the DATA OUT are manifested respectively by the presence and absence of direct current. Any conventional circuit may be used to convert the current output of Read Circuit 500 to an appropriate voltage level representative of a binary ONE or binary ZERO.

WRITE CIRCUIT 400

The Write Circuit 400 is operative in accordance with the state of the pair of complementary low level data signals applied to lines DATA IN and $\overline{\text{DATA IN}}$ and the signals applied to line DC to provide signal levels representative of binary ONE and binary ZERO data at output terminals A and B in FIG. 3*a*. These signal levels are in turn applied to each of the Write Buffer Inverter Circuits 404*a* through 404*d* in the sectors 1 through 4 respectively for conditioning them to write new data into the selected memory cell within one of the sectors 1 through 4.

During a write operation, the chip enable signal $\overline{CS}$ is at zero volts which corresponds to binary ZERO which causes the Chip Select circuit 620 to force signal $\overline{CS'}$ to a binary ZERO (i.e., Vss) indicative of the fact that the chip is selected. Also, the memory controller or other external apparatus forces R/W signal to a binary ONE (i.e., +3 volts) signalling the chip of a write cycle of operation wherein the content of the memory cell selected is to be modified in accordance with new information applied by the controller.

The signals $\overline{CS'}$ and R/W cause transistors 400-7, 400-8, 400-13 and 400-14 to remain in a nonconductive state. During the time interval defined by clocking signal 01, storage nodes 400-4 and 400-14 of the Write Circuit 400 are charged negatively (i.e., −11 volts). Also during the same interval, line DC is forced to a binary ONE which in turn discharges node 400-2 through Write Circuit transistor 400-1.

During the time interval defined by clocking signal 02, the storage node 400-2 is charged negatively through Write Circuit transistor 400-1. Also during this interval, Write Circuit transistor 400-19 charges negatively the storage node 400-21 and the bootstrapping capacitor of each of the Write Buffer Circuits 404*a* through 404*d* corresponding to capacitor 404*a* in FIG. 3*a* switching the transistors associated therewith (i.e., those corresponding to transistor 404*a*-2) into conduction.

Since the clocking signal 02 is applied to the source of the Write Circuit transistor 400-6, the storage node 400-4 remains charged negatively. Additonally, the capacitance associated with line DC is discharged conditionally in accordance with the content of the one of the data control cells of the selected column.

At the end of the timing interval defined by clocking signal 02, storage node 400-2 is conditionally discharged to voltage Vss through transistor 400-1 in accordance the state of line DC. In particular, if line DC remains charged (i.e., at a binary ONE), node 400-2 discharges to voltage Vss. If however, line DC discharges to voltage Vss (i.e., to a binary ZERO), node 400-2 remains charged (i.e., a binary ONE). Accordingly, node 400-2 assumes a state opposite to that of line DC and therefore can be thought of as performing an inverting or complementing operation. If the storage node 400-2 is discharged to voltage Vss, storage node 400-4 remains charged. But if storage node 400-2 remains charged, then storage node 400-4 discharges through Write Circuit transistor 400-6 to voltage Vss. Accordingly, following the end of the timing interval defined by clocking signal 02, storage node 400-4 can be seen to assume a state representative of the state of line DC.

The transistors 400-7 through 400-9 are arranged so that storage node 400-14 is conditionally discharged to assume the state of node 400-4 in accordance with the state of the input data signal before the occurrence of clocking signal 03. Specifically, when the voltage applied to the DATA IN line is a binary ONE (i.e., +3 volts), then storage node 400-14 is arranged to assume the same state as that of storage node 400-4. This is accomplished by having storage node 400-14 conditionally discharged through Write Circuit transistors 400-9 and 400-6 in accordance with the state of storage node 400-4. For example, if storage node 400-4 is at the voltage Vss (a binary ZERO), storage node 400-14 is discharged to the voltage Vss through transistors 400-9 and 400-6 (assumes a binary ZERO state). If however, storage node 400-4 is charged negatively (i.e., a binary ONE) it holds transistor 400-9 nonconductive and storage node 400-14 remains charged negatively (i.e., at a binary ONE).

If the voltage applied to the line DATA IN is a binary ZERO (i.e., 0 volts), then storage node 400-14 is arranged to assume a state opposite to that of storage node 400-4. This is acccomplished by having storage node 400-14 conditionally discharged through Write Circuit transistors 400-7 and 400-8 in accordance with the state of storage node 400-4. For example, when the storage node 400-4 is charged negatively (i.e., a binary ONE), then storage node 400-14 is discharged through transistors 400-7 and 400-7 to the voltage Vss. If, however, storage node 400-4 is discharged (i.e., a binary ZERO), then storage node 400-14 remains charged (i.e., remains a binary ONE). Thus, it is seen that the state of storage node 400-14 represents the results of an exclusive or operation performed upon the signals applied to lines DATA IN and DC.

The timing signal 03 is arranged to follow timing signal 02 within a time interval which is sufficient to have storage node 400-14 discharged. During the time interval defined by clocking signal 02, storage node 400-22 is conditionally charged in accordance with the state of storage node 400-14. This in turn applies the appropriate signal levels to output terminals A and B. In greater detail, during the presence of timing signal 03, if storage node 400-14 is charged negatively (i.e., binary ONE), storage node 400-22 is charged negatively through Write circuit transistor 400-16. This in turn switches Write Circuit transistor 400-17 and Write Buffer transistor 404*a*-4 of each of the Write Buffer Circuits 404*a* through 404*d* into conduction. At the same time, Write Circuit transistor 400-16 discharges storage node 400-21 and bootstrapping capacitor 404*a*-5 of each of the Write Buffer circuits to the voltage Vss. This in turn switches Write Buffer transistor 404*a*-2 of each of the Write Buffer Circuits from a conductive state to a nonconductive state. With both the Write Buffer circuit transistors 404*a*-4 and 404*a*-1 of each of the Write Buffer circuits conductive, storage node 404*a*-3 and the common digit/sense lines D/S1 through D/S4 are discharged rapidly to voltage Vss together with the input/output line of the "selected" row within one of the sectors.

If storage node 400-14 is discharged (i.e., at a binary ZERO), storage node 400-22 is not charged during the presence of clocking signal 03. Hence, storage node 400-21 together with the bootstrapping capacitor 404*a*-5 of each of the Write Buffer Circuits remain charged. Accordingly, Write buffer transistors 404*a*-2 and 404*a*-1 conduct charging storage node 404*a*-3 and the common digit/sense lines D/S1 through D/S4 where required (i.e. lines precharged during timing interval defined by clocking signal 01.) It can be seen that the storage node 400-14 conditions the output transistors of the Write Circuit 400 so as to apply appropriate signal levels to terminals A and B consistent with the results of a logical comparison. This is accomplished by performing a complement operation upon the results produced by the exclusive or operation. From the above it is seen that during a write operation the Write Circuit 400 performs a logical comparison operation upon the binary signals applied to the lines DC, DATA IN, and $\overline{\text{DATA IN}}$. The truth table for the logical operation performed by the Write Circuit 400 is as follows:

WRITE OPERATION

| Line Data in Input Data | Line $\overline{\text{DC}}$ Data in Data Control Cell | Line D/S Data in Cell |
|---|---|---|
| 0 | 0 | 1 |
| 0 | 1 | 0 |
| 1 | 0 | 0 |
| 1 | 1 | 1 |

During a read cycle of operation, the chip enable signal $\overline{\text{CS}}'$ applied to the Write Circuit 400 is still at a binary ZERO (i.e., Vss) indicative of the fact that the chip is selected. However, the R/W signal is forced to a binary ZERO (i.e., to zero volts) by the memory controller or other external apparatus indicative of the fact that the chip is to perform a read operation. The signal R/W switches Write Circuit transistors 400-13 and 400-20 into conduction. These transistors when conductive cause storage node 400-14 and storage node 400-21 together with the Write Buffer bootstrapping capacitors to be discharged rapidly after the termination of clocking signals 01 and 02 respectively.

With both storage nodes and capacitors discharged, both Write buffer transistors 404*a*-2 and 404*a*-4 of each of the Write Buffer circuits 404*a* through 404*d* are held nonconductive during the time interval defined by clocking signal 03. Accordingly, Write Buffer transistor 404*a*-1 of each of the Write Buffer circuits is held nonconductive and is thereby prevented from affecting the state the common digit/sense lines D/S1 through D/S4.

Because the storage nodes 400-14 and 400-21 can be discharged rapidly shortly after the signal R/W assumes zero volts indicative of a read operation, the command to perform a read operation instead of a write operation can be issued just prior to the occurrence of timing signal 03. This arrangement allows the memory controller or external unit greater flexibility in processing of memory requests as well as enabling it to respond with greater rapidity to changes in requests.

From FIG. 3*a*, it is seen that the Write Circuit 400 operates in a manner similar to the above when the chip is "unselected", that is when the Chip Enable signal $\overline{\text{CS}}'$ is forced to a binary ONE state (i.e. to −11 volts). This switches Write Circuit transistors 400-12 and 400-18 into conduction and these transistors operate in a manner similar to transistors 400-13 and 400-20 to discharge storage nodes 400-14 and 400-21 to the voltage Vss and inhibit the operation of Write Buffer transistor 404*a*-1 of each of the Write Buffer Circuits 404*a* through 404*d*.

SYSTEM OPERATION

With particular reference to FIGS. 3*a*, 3*b* and 3*c* and the timing diagram of FIG. 4, the operation of the memory chip of the present invention will now be described with respect to performing a read cycle of operation and a write cycle of operation.

READ CYCLE OF OPERATION

It is assumed that the memory cell positioned at location 0,0 in FIG. 3*a* is selected to have its contents read out to an utilization device via the line DATA OUT. It is further assumed that initially the data control cell DCO associated with the column in which the selected memory cell is located stores status information in the form of a charge on capacitor C representative of a binary ZERO (i.e., the difference in potential between the gate and the source electrodes of the storage transistor of the cell DCO is not greater than −5 volts, represented in waveform *i* in FIG. 4 by a value of zero volts). Stated differently, the storage node of cell DCO is initially uncharged. Also, as seen from waveform *g* in FIG. 4, it is assumed that the selected memory cell stores information in form of a charge which is representative of a binary ONE. This means that capacitor C is charged negatively to a potential greater than −5 volts represented in FIG. 4 by a value of −5 volts which is applied to gate or control electrode of its storage transistor S. That is, the storage node of the selected memory cell is initially charged. It will be appreciated that the voltage values designated are given for the purpose of illustration only.

Figure 4:
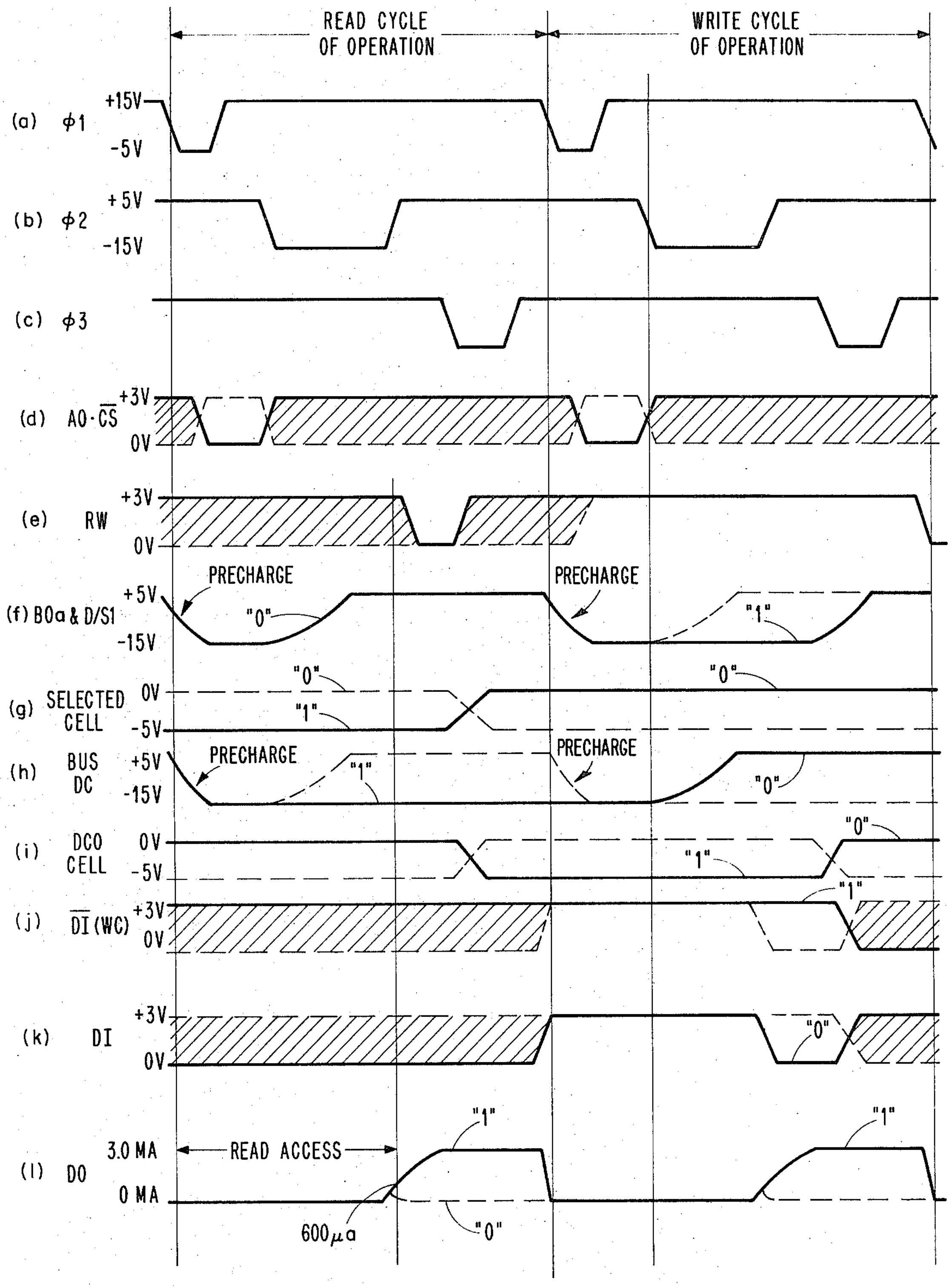
FIG. 4 illustrates a series of waveforms used to explain the operation of the present invention; and, FIG. 5 illustrates a physical arrangement of the various sections included within the chip of FIG. 1.

In FIG. 4, the lined or shaded areas appearing in the different waveforms (e.g., *d*, *e*, *j* and *k*) indicate the time intervals during which the state of the signals may change while the unshaded areas designate those time intervals when the state of the signals are required remain unchanged. The solid lines in the waveforms indicate the state of the signals for the examples given to illustrate the operation of the memory chip as is probably already apparent from the explanation given thus far. Since the memory chip is "selected", the chip select signal $\overline{CS}$ is a binary ZERO (i.e., to zero volts) as illustrated by waveform *d* of FIG. 4. The Read/Write command control signal R/W is also forced to a binary ZERO (i.e., zero volts) at the appropriate time period (i.e., prior to clocking signal 03 as illustrated by waveform e of FIG. 4). This places the Write Circuit 400 in a state for performing a read operation. That is, the Write Circuit 400 is in effect disabled.

Referring to waveforms *g* and *f* in FIG. 4, it will be noted that during a first interval defined by clocking signal 01 (i.e., when signal 01 is a binary ONE defined by a −15 volt level), the capacitances corresponding to capacitor C1 of the data control bus DC and the digit/-sense bus B0*a* are charged to a negative potential (i.e., 11 volts) through transistors 610-DC1 and **612-0*a* respectively of block 610** in FIG. 3*a*. Although not shown, simultaneously therewith all of the digit/sense buses of all of the other rows of the memory chip are also charged negatively.

Additionally, the storage nodes of all of the row decoder circuits 260 and column decoder circuits 360 are charged to a negative potential together with the bus capacitances and boot-strapping capacitors associated therewith placing all of the lines X0 through X63 and Y0 through Y31 at the voltage Vss representative of an "unselected" state. The Read Buffer Inverter circuits **402*a* through 402*d* charge the capacitances associated with the common digit/sense lines D/S1 through D/S4 to a negative potential. Lastly, the Read Circuit transistor 500-12 in FIG. 3 charges storage node 500-10** negatively.

During the precharge interval, the interface circuits 240 and 340 together with chip select circuit 620 in FIGS. 3b and 3c are conditioned by timing signals 01and $\overline{\mathbf{01}}$*** to sample the states of the binary address signals A0 through A4 and A5 through A10 and the chip select signal $\overline{CS}$ respectively. At termination of clocking signal 01 in response to clocking signal $\overline{\mathbf{01}}$, these circuits produce pairs of complementary signals CS′, $\overline{CS}$′, A0′, $\overline{A0}$′ through A10′, $\overline{A10}$′ in accordance with the previously sampled state of the input signals. The address signals A0′ through A10′ and their complements condition only the "selected" row and column decoder gates corresponding to gates 340-1 and 360-1 respectively to apply appropriate outputs to lines X0 and Y0 for conditioning row selection circuit 280-0*a* and column select circuit 380-0*a*. That is, only the lines XO and YO are charged negatively and all of the remaining lines associated with the "unselected" row and column decoder gates remain at the voltages Vss. Also, the chip select circuit 620 forces signals CS′ and $\overline{CS}$′ to the appropriate states which enable both the Read Circuit 500 and Write Circuit 400** for operation in the manner previously described.

During the timing interval defined by clocking signal 02 (i.e., when signal 02 is a binary ONE or at −15 volts), select transistor 383 is conditioned by the negative potential applied to its control electrode to drive the bus **02-0*a* associated with the selected memory cell from a positive voltage Vss to a negative voltage (i.e., −13 volts) in response to clocking signal 02.** This switches on the read transistor R in all of the cells of the selected column. If a memory cell within the column stores a binary ONE (i.e., a charge on parasitic capacitor C corresponding to a negative potential greater than 5 volts), then its storage transistor S is conductive which in turn discharges the capacitor C1 of the digit/-sense line associated therewith from a binary ONE (i.e., −13 volts) to a binary ZERO (i.e., +5 volts). If a memory cell within the column stores a binary ZERO (i.e., a charge on parasitic capacitor C corresponding to a negative potential less than 5 volts), then storage transistor S is nonconductive and the capacitor C1 of the digit/sense line remains at a binary ONE (i.e., −13 volts).

Referring to the specific example, since the data control or status cell DCO of the selected column initially stores a binary ZERO, the bus DC remains charged negatively or it is at a binary ONE as illustrated by waveform *h* in FIG. 4. By contrast because the selected memory cell of the column initially stored a binary ONE, the capacitor C1 of the bus B0*a* is discharged through series transistors R and S to the voltage Vss as illustrated by waveform *f* of FIG. 4. Additionally, the capacitance associated with common digit/sense line D/S1 is discharged through select transistor **280-0*a*** and transistors R and S to the voltage Vss (also illustrated by waveform f of FIG. 4).

From the above, it is seen that reading or interrogating the memory cells of a selected column results in the read out to the digit/sense buses associated therewith of the complement of the data content stored in each of the memory cells as well as the read out to the DC bus of the complement of the status information stored in the data control cell of the selected column. Also, the common digit/sense line associated with the sector of the selected memory cell receives the complement of the content of the selected cell.

Prior to the termination of the time interval defined by signal 02, the Read Circuit 500 is operative to compare logically the content of the data control cell and the content of the selected memory cell to ensure that an indication of the correct data is applied to the DATA OUT line. As previously described, the Read Circuit 500 performs an exclusive or operation upon the signal levels applied to the lines DC and one of the common digit/sense lines.

As mentioned, the capacitances associated with lines DC and D/S1 are charged to a state representative of the complement of the content of the data control cell and selected memory cell respectively. The inverter transistors 220-1 and 220-2 invert the state of line DC and the Read Buffer Circuit **402*a* inverts the state of line DC and the Read Buffer Circuit 402*a* inverts the state of line D/S1 and the inverted signal levels are applied via lines $\overline{DC}$ and $\overline{D/S1}$ to the Read Circuit 500. In particular, since the signal level applied to line D/S1 is representative of a binary ZERO, the line D/S1 is charged negatively (to a binary ONE) via Read Buffer Circuit transistor 402*a*-7** of FIG. 3*b* as a result of transistor **402*a*-5 being held nonconductive by the binary ZERO state of line D/S1. The binary ONE state of line DC holds inverter transistor 220-2 conductive to force line DC to a binary ZERO state notwithstanding transistor 220-1 being rendered conductive by clocking signal 02.**

As illustrated by waveform *e* of FIG. 4, the Read Circuit 500 as a result of its exclusive or operation is operative to provide an output signal in the form of a direct current indicative of the fact that a binary ONE is stored in the selected memory cell based upon the lines DC and D/S1 being in opposite states. That is, since the data control cell of the selected column stored a binary ZERO, line DC is forced to a ONE (i.e., charged negatively) enabling Read Circuit transistor 500-16 of FIG. 3*b* in turn charging node 500-15 negatively. Because the selected memory cell stores a binary ONE, line $\overline{D/S1}$ is forced to a ONE (i.e., charged negatively) enabling Read Circuit transistor 500-1 of FIG. 3*b* thereby establishing a direct current path from the line DATA OUT to the voltage source Vss through transistors 500-16, 500-1 and 500-18. This in turn produces the current output illustrated by waveform 1 of FIG. 4.

At the termination of timing signal 02, the output or read transistors R of the cells of the selected column are switched off by bus 02-0*a* being forced to voltage Vss by select transistor 382 of FIG. 3*a*. Also, at the termination of timing signal 02, the inverter transistor 220-1 and Read Buffer circuit transistor 402*a*-7 are switched off effectively disconnecting the Read Circuit 500 from the system without affecting the state of lines DC and D/S1. Thus, the Read Circuit 500 continues to operate as before and increases the current flowing through the established direct current path until a steady state value is reached. Since the magnitude of current is sufficient for external sense circuits to determine the presence of a ONE or ZERO at approximately the time that the clocking signal 02 terminates, the "read access" time of the memory chip corresponds to the time interval designated in waveform *e* of FIG. 4. Specifically, the "read access" time of the chip corresponds to the time interval defined by the midpoint of the negative-going transition of clocking signal 01 to the instant the output current reaches a value which approximates 600 microamperes. Since the operation of the Read Circuit 500 from this point is no longer dependent upon signals from the memory cells, the memory cycle for a read operation can be effectively shortened to have a duration corresponding to the time indicated.

Following the termination of the clocking signal 02, it is seen that the read cycle of operation concludes with a timing interval defined by clocking signal 03. During this time interval the input or "write" transistor W of each of the cells of the selected column are switched into conduction and the information applied to the digit/sense lines associated therewith is stored on the capacitor C of the storage transistor S of each of memory cells of the selected column. More specifically, the column select transistor 381 which is conditioned for conduction by the "selected" column decoder gate 360-1 is operative in response to signal 03 to switch the bus 03-0*a* from the voltage Vss to a negative potential (−13 volts) switching all of the transistors W into conduction.

Since this is a read cycle of operation, no new information is to be written into any of the cells of the selected column, the information applied to the digit/-sense lines represents the complement of the information stored in the cells read out during the timing interval defined by signal 02 and it is this information which is stored in the cells. For example, since the data control cell DCO initially stored a binary ZERO, the line DC is charged negatively (i.e., a binary ONE). Therefore during the presence of signal 03, the capacitor C is charged negatively (i.e., conditioned to store a binary ONE) through transistor W as illustrated by waveform i of FIG. 4.

As illustrated by waveform g of FIG. 4, it is seen that the selected memory cell which previously stored a binary ONE is conditioned to store a binary ZERO. That is, during the interval defined by signal 03, the capacitor C is discharged to the voltage Vss applied to the bus B0*a*. Because the complement of the information read is that which is written into the cells of a selected column, there is no time expended in having to sense the information,invert the information sensed, and restore same to the selected cell. The complemented information is already available and hence no time other than that required for performing the writing of the information into the cells is required.

The states of the selected memory cell and data control cell together with the corresponding output signals for these states at the completion of a read cycle of operation are given for convenience in the following table. The symbol * denotes the example given.

READ CYCLE OF OPERATION

| Data Stored in Cell | Data Stored in Data Control Cell | Data Out |
|---|---|---|
| 0 | 0 | 0 |
| 1 | 0 | 1 |
| *0 | 1 | 1 |
| 1 | 1 | 0 |

Summarizing the above, it is seen that when the content of the Data Control cell is a binary ZERO and the content of the selected memory cell is a ONE, the Read Circuit 500 produces an indication that the selected memory cell stores a ONE. The same is true if the content of the Data Control cell is a ONE and the content of the selected memory cell is a ZERO. If however, the Data Control cell and the selected memory cell both store binary ONES or binary ZEROS, the Read Circuit 500 is operative to provide no direct current path and no current output representative of the fact that the selected memory cell stores a binary ZERO which is illustrated by waveform 1 in FIG. 4. Accordingly, the data control cell can be viewed as supplying an indication of the number of times the cells of a particular column has been selected to have their contents read. If the column has been selected an even number of times, the data control cell stores a binary ZERO and when the column has been selected an odd number of times, the data control cell stores a binary ONE. Here, it was initially assumed that the data control cell stored a binary ZERO signifying that the content read out from the selected memory cell is a true or correct indication of the actual information stored and therefore does not have to be complemented. If the data control cell stored a binary ONE, this signifies that the content read out from the selected memory cell is not a true or correct indication of the actual information stored and therefore must be complemented.

It is also seen that during the interval defined by signal 03 of the same cycle of operation, the contents of the data control cell are updated (i.e., incremented by one) to properly reflect the number of times its particular column has been selected. At the same time, the remaining cells of the selected column have their contents freshened by having them complemented. From this, it can be seen that it may be desirable without any modification to the chip to shorten the duration of the cycle for a read operation to a length of time corresponding to the "read access" time indicated in waveform 1 of FIG. 4. This would require the memory controller or equivalent external control apparatus to condition the external timing circuits to generate only timing signals 01 and 02 (e.g., mask out signal 03) in response to each request specifying a read operation. This would enable the memory controller to initiate another cycle of operation immediately upon termination of timing signal 02. It will of course be appreciated that external apparatus can be provided for freshening the memory cells of the chip within the time previously specified (i.e., within a 2 millisecond period).

WRITE CYCLE OF OPERATION

It is assumed that during the write cycle of operation the same memory cell is selected and that new information in the form of a binary ZERO applied to the line DATA IN is going to be written therein. It will be appreciated that a write cycle of operation requires the occurrence of all three clocking signals 01, 02 and 03. Since the operation of the chip during the intervals defined by signals 01 and 02 is similar to that described above in connection with the Read Cycle of operation, it will only be repeated to the extent necessary herein.

As a result of completing the previous read cycle of operation, it is seen from waveforms *f* and *g* that the selected memory cell positioned at the intersection of lines XO and YO stores a binary ZERO and that data control cell DCO of the selected column stores a binary ONE. During the precharge time interval defined by clocking signal 01, the capacitors C1 of lines DC and B0*a* are charged negatively (i.e., to a binary ONE) as indicated by waveforms *h* and *f* of FIG. 4. Since the capacitor C1 of line DC is already a binary ONE, it will only be required to be charged by a very small amount (i.e., the amount of charge necessary to replenish that which may have been dissipated.) Also during clocking signal 01, the capacitances associated with the row and column decoder circuits, the Read Circuit 500 and the Write Buffer Circuits are also charged negatively prior to the occurrence of timing signal 02 preparatory to the read out of the contents of the memory cells of a selected column. Also, in the manner previously described, the "selected" row and column decoder circuits are conditioned by the interface circuits 240 and 340 to force the lines XO and YO to binary ONES specifying the selection of the memory cell and column defined by the address signals AO through A4 and A5 through A10.

During the time interval defined by clocking signal 02, the "read" transistors R of the memory cells of the column are conditioned to discharge conditionally their respective lines in accordance with the cell contents. This results in signal levels representative of the complement of the memory cell contents being applied to each of the digit/sense lines of sector 1. Accordingly, since the selected memory cell stores a binary ZERO, line B0*a* remains charged negatively (i.e., at a binary ONE). Conversely, since the data control cell DCO stores a binary ONE line DC is discharged to +5 volts (i.e., to a binary ZERO) through transistors R and S. The waveforms f and h of FIG. 4 illustrate the changes in state of buses B0*a* and DC.

In the manner described previously for a read cycle of operation, the Read Circuit 500 is operative to produce an output signal in the form of a current which indicates that the selected memory cell stores information representative of a binary ONE. That is, the Read Circuit 500 logically combines signals representative of the contents of the data control cell DCO and the selected memory cell by performing an exclusive or operation which due to the opposite state of these signals results in the output current illustrated by waveform 1 of FIG. 4.

It will be also noted that prior to the occurrence of timing signal 02, the memory controller signals the chip that it is to perform a write operation by forcing the Read/Write command signal RW to a binary ONE state (i.e., +3 volts), as illustrated by waveform e of FIG. 4. As mentioned previously, the signal RW may be switched from the binary ONE state to a binary ZERO state "aborting" or cancelling the Write operation any time prior to the occurrence of clocking signal 03 to permit discharging the storage nodes or parasitic capacitances associated with the Write Circuit 400.

During the time interval starting at termination of clocking signal 02 to approximately the center of the interval of the "1" or "0" portions of waveforms j and k, the Write Command signal WC is required to remain at a binary ONE (i.e, +3 volts) to permit the Write Circuit 400 to store an indication of the state of the signal applied to line DATA IN relative to the state of the signal applied to line DC representative of the complement or inversion of the information stored in the data control cell DCO. That is, during this time the signal applied to line DATA IN allows the storage node 400-14 to be conditionally discharged to the state to which node 400-14 is charged (i.e., a state which is representative of the state of line DC). Thereafter, the storage node 400-14 stores an indication of the comparison operation in the form of an exclusive or operation with respect to the signals applied to the lines DATA IN and DC. Since the signal applied to the DATA IN line is a binary ZERO and the signal applied to the line DC is also a binary ZERO indicative that the data control cell DCO stores a binary ONE, the storage node 400-14 remains charged negatively representative of a binary ONE.

During the timing interval defined by clocking signal 03, the Write Circuit 400 is operative to apply appropriate signal levels to output terminals A and B which condition the Write Buffer circuit 402*a* to charge or discharge line D/S1 in accordance with the state of storage node 400-14. That is, because storage node 400-14 in FIG. 3*a* is a binary ONE, this causes storage node 400-22 to be charged negatively (i.e., to a binary ONE) and storage node 400-21 to be discharged to Vss (i.e., to a binary ZERO) thereby forcing terminal B to a binary ONE and terminal A to a binary ZERO respectively.

This conditions the Write Buffer circuit 402*a* to switch transistor 404*a*-5 from a conductive state to a non-conductive condition and to switch transistor 404*a*-4 from a nonconductive state to a conductive state thereby causing the line D/S1 to discharge to the voltage Vss as illustrated by the waveform *f* of FIG. 4. This in turn causes the write transistor W of the selected memory cell to maintain the capacitor C at the voltage representative of a binary ZERO as illustrated by waveform g of FIG. 4. At the same time, the write transistor W of the data control cell DCO is conditioned to discharge the capacitor C to the voltage representative of a binary ZERO as illustrated by waveform i of FIG. 4. The states of the input data, the data control cell and selected memory cell at the completion of a write cycle of operation are given for convenience in the following table. The symbol * denotes the example given.

WRITE CYCLE OF OPERATION

| INPUT DATA | DATA STORED IN DATA CONTROL CELL | DATA STORED IN CELL |
|---|---|---|
| 0 | 1 | 1 |
| *0 | 0 | 0 |
| 1 | 1 | 0 |
| 1 | 0 | 1 |

It can be seen from the foregoing that the selected memory cell is conditioned to store a binary ZERO instead of the results of the exclusive or operation in order to take into consideration the complementing of the contents of the data control cell DCO during the interval defined by timing signal 03. Thus, as indicated previously the Write Circuit 400 over an entire write cycle of operation can be viewed as performing a comparison operation upon the signals representative of the new information to be written into the selected cell and the information stored within the data control cell and then causing the result of the comparison to be written into the selected memory cell (i.e., a binary ONE if the signals compare and a binary ZERO if the signals do not compare). This can be seen from a comparison of waveforms *g*, *i*, and *k* of FIG. 4. The Write Circuit 400 provides the correct signals by in effect complementing the result of the exclusive or operation which renders the results of a comparison operation. For further details regarding the operation of the Write Circuit 400, reference may be made to the copending application titled "A Memory Write Circuit" invented by William L. Martino Jr. Ser. No. 215,977, filed on even date herewith and assigned to the same assignee named herein.

Figure 5:
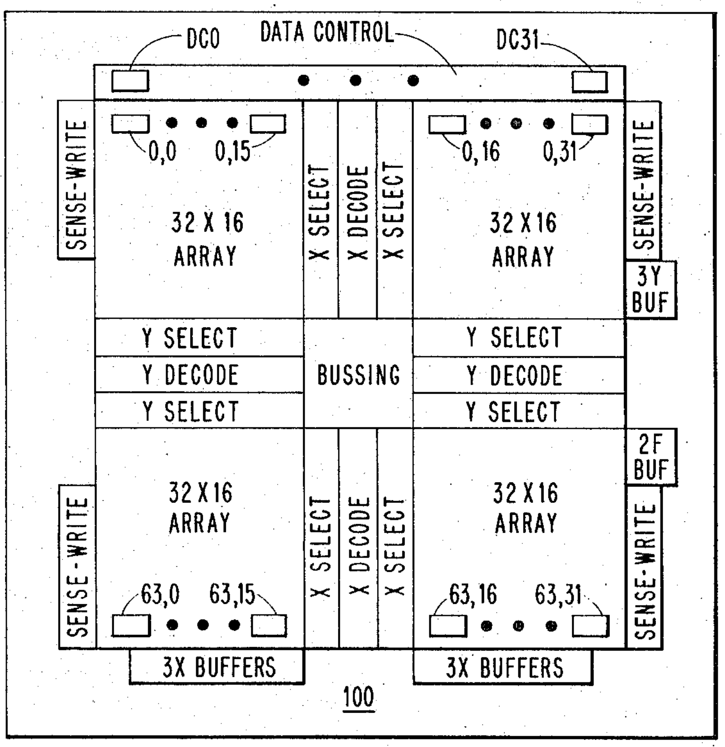

The entire memory array illustrated in FIG. 2 and in greater detail in FIGS. 3*a*, 3*b* and 3*c* may be fabricated as an integrated circuit on a single substrate or chip of N type silicon. FIG. 5 shows one way in which the major elements of FIG. 2 are positioned within the chip. To reduce the capacitances associated with the digit/sense row and column lines and thereby enhance the speed of the memory array, the memory cell area is partitioned into four sectors, each including 512 cells, as shown. The row and column select and decode transistor circuits together with the read and write circuits associated with each sector are positioned adjacent thereto. Additionally, the cells of the data control are arranged as an additional row of the array as shown.

It will be recognized by those skilled in the art that well known fabrication techniques may be utilized to construct the cells and associated circuits. Also, well known techniques may be employed to form the required common buses along which the various common signals such as the clocking signals are applied to the sectors.

It should be clear that other ways of positioning the various elements of FIG. 2 may also be employed. However, in the arrangement employed it will be noted that the invention provides substantial saving in the surface area of the chip by obviating the need for refresh amplifier circuits.

From the foregoing, it is seen that the invention provides a technique for reducing significantly the power dissipation of a memory array during both read and write cycles of operation. More importantly, the technique by obviating the need for refresh amplifier circuits increases significantly the density of the number of bits which can be concentrated into a single chip in that the cells for storing the status information for each column can be identical in construction to the memory cells.

Moreover, the invention provides for automatic freshening of the contents of the memory cells during normal read and write cycles of operation. In the preferred embodiment, during a read cycle of operation, the contents of the memory cells within a selected column are simultaneously inverted and refreshed automatically. During a write cycle of operation, correct input data is written into an addressed cell within the selected column while the contents of the remaining cells of the column are inverted and refreshed automatically. Because these operations do not require that the contents of the memory cells be sensed, inverted and then written back into the same cells, the invention reduces the read access time of the memory by being able to provide for a shortened read cycle of operation. Also, in the performance of these operations no additional circuits or command signals are required since the invention makes use of available circuits and clocking signals within the system. Further, where the groups of memory cells are sequentially addressed during the normal operation of the memory, the contents of all of the memory cells will be inverted and refreshed automatically thereby obviating the need for external apparatus or additional cycles for performing such operations.

It will be noted that since contents of each of the auxiliary or data control cells associated with each group of cells are inverted or modified each time its group is selected, each data control cell can be thought of as maintaining a count of the number of times its group has been selected. It should be appreciated however that the contents of a data control cell are not required to be initially set to any particular state since each time new information is written into any one of the cells within the group, this information is compared with the control or reference information stored by the data control cell for determining the actual binary information to be written into the cell. Hence, more simply, the data control cells can be seen to provide reference or control information for an entire group of cells which is used for interpreting the actual binary information stored within the cells of the group and for determining the actual binary information to be written into the cells of the group.

It will be appreciated by those skilled in the art that many changes can be made to the embodiment illustrated without departing from the scope of the present invention. For example, the invention is not limited to the use of a particular three transistor cell configuration. However, it will be understood that it is desirable to use a cell configuration with a minimal number of terminal connections for ease in fabrication. Further, although insulated gate MOS P channel devices have been illustrated and described, other switching devices can also be used.

While in accordance with the provisions and statutes, there has been illustrated and described the best form of the invention known, certain changes may be made in the technique and system described without departing from the spirit of the invention as set forth in the appended claims and that in some cases, cartain features of the invention may be used to advantage without a corresponding use of other features.

Having described the invention, what is claimed as new and novel is:

1. A method of retrieving information and performing non-destructive read operations on the cells of an array of randomly addressable dynamic memory cells arranged in rows and columns to form a matrix and which are addressed in accordance with a plurality of input address signals, each method comprising the steps of:

a. storing digital signals within a row of said cells representative of a count as to the number of times the memory cells of each of said columns have been interrogated;

b. reading out signals corresponding to the complement of the contents of the memory cells of an interrogated column and the contents of one of said memory cells of said row associated with said column representative of the number of times the column has been interrogated;

c. logically combining a singal representative of the contents read from an addressed one of said memory cells of said column with a signal read from one of said row of said memory cells to produce a signal representative of the actual binary information stored within said addressed memory cell for transfer to a utilization device; and, d. writing the signals read from the cells of said interrogated column and said one cell of said row back into said column thereby complementing and refreshing the contents of said memory cells and updating said count.

2. The method of claim 1 wherein the step (c) of logically combining includes the step of performing an exclusive or operation upon said signals to produce an output signal in accordance with the results of said exclusive or operation.

3. The method of claim 1 wherein binary information signals from said utilization device are written into an addressed one of said cells of said array by performing the steps of:

a. logically combining said signal read from one cell of said row of said memory cells associated with the column and a binary information signal from said utilization device to produce an output signal representative of the actual information signal to be written into said addressed cell;

b. writing the complement of said output signal in step (a) into said addressed cell; and, c. writing the complement of the signals stored in the remaining cells of said interrogated column back into said column, and said signal stored in said one cell of said row of said memory cells back into said one cell.

4. The method of claim 3 wherein step (a) of logically combining a signal includes the step of performing an exclusive or operation upon said signals to produce said output signal in accordance with the results of said exclusive or operation.

5. A method of retrieving information and performing non-destructive read operations on an array of randomly addressable dynamic memory cells arranged in rows and columns to form a matrix, said method comprising the steps of:

a storing digital signals within a row of said cells representative of a count as to the number of times the cells of its respective column have been interrogated;

b reading out signals corresponding to the complement of the contents of the memory cells of an interrogated column and the contents of one of said memory cells of said row associated with said column representative of the number of times the column has been interrogated;

c logically comparing a signal representative of the contents read from an addressed one of said memory cells of said column with a signal read from one cell of said row of memory cells for determining whether said content read from said addressed one of said memory cells is correct for transfer to a utilization device; and, d writing the signals read from the cells of interrogated column and said one cell of said row without modification back into said column so as to complement and refresh the contents of said memory cells of said column and update said count.

6. The method of claim 5 wherein step (a) of logically comparing includes the step of performing an exclusive or operation upon said signals to produce said signal in accordance with the results of said exclusive or operation.

7. The method of claim 5 wherein binary information signals from said utilization device are written into an addressed one of said cells by performing the steps of:

a logically comparing said signal read from said one cell of said row of memory cells with a binary information signal from said utilization device to produce an output signal representative of the actual information signal to be written into said addressed cell; and, b writing the complement of said signal in step (a) into said addressed cell in place of said complement of said signal read from said addressed cell, the signals read from the remaining cells of said interrogated column, and said signal read from said one cell of said row of said memory cells back into said column.

8. The method of claim 7 wherein said step (a) of logically comparing includes the step of performing an exclusive or operation upon said signals to produce said signal in accordance with the results of said exclusive or operation.

9. A method of reducing the average power dissipated over a plurality of a number of memory cycles by a non-destructive read integrated circuit memory store including a two dimensional array of randomly addressable dynamic memory cells arranged in rows and columns wherein said rows are interconnected along one dimension by digit/sense lines and said columns are interconnected along a second dimension by first and second control lines, each of said cells including a plurality of transistors arranged to store information by charge storage across a storage transistor in accordance with the state in the information signals applied to a corresponding one of said digit/sense lines, said memory store further including an additional row of memory cells, each cell being coupled to said first and second control lines of a different one of said columns, for storing status signals indicative of the number of times the memory cells of each column within said store have been interrogated for read out of their respective contents, said method comprising the steps of:

a applying a signal during a read interval of a memory cycle to said first control line for reading out signals corresponding to the complement of the contents of the memory cells of an interrogated column to corresponding ones of said digit/sense lines by switching the state of said lines in accordance with said charge storage of said cells of said column and the contents of a predetermined one of said memory cells;

b. logically combining signals applied to the digit/-sense line of an addressed cell and said common digit/sense line read out during the performance of step (a) to produce an output signal representing the actual binary information stored within said addressed memory cell within said interrogated column for read out to a utilization device; and, c. then applying a signal during a write interval of said memory cycle for writing the signals produced by step (a) back into the cells of said interrogated column and said predetermined one of said memory cells thereby complementing the information contents of said cells so that when the same column is selected during a subsequent read cycle of operation the state of said digit/-sense line is not switched during said read interval thereby reducing the number of times said state of said lines are switched over said plurality of memory cycles.

10. The method of claim 9 wherein the step (c) of logically combining includes the step of performing an exclusive or operation upon the signals applied to the digit/sense line of said addressed memory cell and said common digit/sense line to produce an output signal in accordance with the results of said exclusive or operation.

11. The method of claim 9 wherein binary information signals from said utilization device are written into an addressed one of said cells by performing the steps of:

a logically combining said signal applied to the digit/-sense line of said addressed cell and a binary information signal from said utilization device to produce a signal representative of the actual information signal to be written into said addressed cell during said write interval of said cycle;

b applying the complement of said signal in step (a) to said digit/sense line in place of said complement of said signal read from said addressed cell for writing into said addressed cell during said write interval of said cycle; and, c applying the signals read from the remaining cells of said interrogated column to corresponding ones of said digit/sense lines and said signal read from said one cell of said row of said memory cells to said common digit/sense line so as to complement the contents of said remaining cells and said one cell during said write interval of said cycle.

12. The method of claim 11 wherein said step (a) logically combining includes the step of performing an exclusive or operation upon said signals.

13. A memory system comprising:

a plurality of dynamic memory cells, each cell including an input means, output means and charge storage means for storing binary information as an electrical charge; and address selection means coupled to said cells and responsive to input address signals to provide signals for enabling selectively said cells to apply a data signal representative of said binary information stored by said storage means to said output means during a read interval of a memory cycle and to store a data signal applied to said input means during a write interval of said memory cycle;

data control means including a plurality of storage devices, each device being connected to a different group of said dynamic memory cells so as to be selectively enabled each time one of said cells within said group is enabled to maintain a count as to the number of times said group has been selected; and, reading means connected to said memory cells and said storage devices, said reading means being operative to logically combine a data signal read out from said output means of an addressed memory cell of a selected group of said cells and a signal read out from said device connected to said group during said read interval of said memory cycle, to produce a signal representative of the actual binary information stored in said cell for transfer to an output device, said group of said cells and said device being enabled by said address selection means during said write interval of said memory cycle to write the data signals read out from said output means of each of said cells of said group and said signal read out from said device during said read interval back into said cells and said device so as to update said count stored by said device and to complement the binary information stored by said charge storage means of said memory cells thereby refreshing said cells contents automatically.

14. The combination of claim 13 wherein said reading means includes logic means for performing an exclusive or operation on said signals read from said addressed cell and said device.

15. The combination of claim 13 in which said dynamic memory cells are arranged in rows and in columns to form a matrix wherein said rows are interconnected along one dimension by an input/output line and a corresponding one of said control devices and said columns corresponding to said groups are interconnected along a second dimension by first and second control lines, said address selection means being operatively connected to said first and second control lines for selectively enabling the memory cells of a column selected in accordance with said input address signals during a memory cycle by applying signals to said first and second control lines defining said read and write intervals.

16. The combination of claim 13 further including:

writing means connected to said control devices and said cells, said writing means including means for receiving an input signal representative of the binary information to be written into a cell designated by said input address signals, said writing means being operative during a write operation to logically combine said signal read out from said device of the column of said designated cell and said input signal to produce an output signal representative of the actual information to be written into said designated cell; and, said address selection means being operative to enable the writing of the complement of said output signal into said designated cell and the writing of the signals read out from the remaining cells of said column and said device during said read interval back into said cells and said device during said write interval.

17. The combination of claim 16 wherein said writing means includes logic means operative to perform an exclusive on operation upon said input signal and said signal read out from said device.

18. The combination of claim 13 wherein each device of said data control means includes a dynamic memory cell similar in construction to said memory cells.

19. The combination of claim 18 wherein said dynamic memory cell includes:

storage, read and write field effect transistors, each transistor having source, control and drain electrodes;

said storage transistor being arranged to store digital information by an electrical charge across a node capacitance between said control and source electrodes;

said drain electrodes of said read and write transistors being connected in common to an input/output terminal;

said read field effect transistor being connected in series with said storage transistor, said read transistor being arranged to sense the state of said storage transistor when conditioned by a signal applied to said control electrode and to apply a signal representative of said state sensed to said input/output terminal; and, said source electrode of said write transistor being connected to said control electrode of said storage transistor, said write transistor being arranged when conditioned by a signal applied to said control electrode to apply a signal representative of the state of said input/output terminal to said storage transistor for storage by said mode capacitance.

20. The combination of claim 19 wherein each of said field effect transistors are insulated gate, P channel enhancement type transistors.

21. A nondestructive read integrated circuit memory device including a two dimensional array of dynamic memory cells addressed by a plurality of input addressed signals, said cells being interconnected along one dimension by digit/sense lines and said memory cells being interconnected along the other dimension by first and second control lines for applying signals defining read and write intervals of a memory cycle, said device further comprising:

data control means including a plurality of storage means, said plurality of storage means being interconnected in said one dimension by a common digit/sense line and each of said storage means being interconnected to said first and second control lines of a different group of memory cells, each of said storage means being arranged to store a reference signal derived independently of the informational content of said different group memory cells used to interpret the informational content of each of the cells within said group; and, read circuit means connected to said common digit/sense line and to said digit/sense lines, said read circuit means including logic means for combining a signal representative of the contents read out from an addressed cell of a group of cells which during said read interval receive a signal on said first control line and a signal read out from said storage means associated therewith, to produce a signal representative of the actual binary information stored by said addressed cell for transfer to an utilization device.

22. The memory device of claim 21 wherein said group of cells and said storage means in response to a signal on said second control line during said write interval of each read cycle of operation invert the contents of said memory cells of said group and said storage means by applying directly said signals representative of the contents of said cells and said storage means read out during said read interval for writing into said cells of said group thereby automatically refreshing the contents of said cells and modifying said reference signal stored by said storage means for correctly interpreting the informational contents of said cells of said group during a subsequent memory cycle.

23. The memory device of claim 21 further including:

write circuit means connected to said common digit/sense line, said write circuit means including means for receiving a binary information signal from an utilization device representative of information to be written into a designated memory cell and being operative during each write operation to logically combine said signal read out from said storage means during said read interval in response to a signal applied to said first control line and said binary information signal to produce an output signal representative of the actual binary information to be stored in said designated one of said memory cells within said group connected to said storage means;

said group of memory cells being responsive to a signal applied to said second control line during said write interval to write the complement of said output signal into said designated one of said memory cells and to write back into the remaining cells and storage means, the signals read out from said remaining cells and said storage means in response to said signal applied to said first control line during said read interval of said same cycle.

24. The device of claim 21 wherein each of said storage means includes a dynamic memory cell similar in construction to said dynamic cells of said array.

25. The device of claim 24 wherein said dynamic memory cell includes:

storage, read and write field effect transistors, each transistor having source, control and drain electrodes;

said storage transistor being arranged to store digital information by an electrical charge across the node capacitance between said control and source electrodes;

said drain electrodes of said read and write transistors being connected in common to a digit/sense terminal;

said read field effect transistor being connected in series with said storage transistor, said read transistor being arranged to sense the state of said storage transistor when conditioned by a signal applied to said control electrode and to apply a signal representative of said state to said digit/sense terminal; and, said source electrode of said write transistor being connected to said control electrode of said storage transistor, said write transistor being arranged when conditioned by a signal applied to said control electrode to apply a signal representative of the state of said digit/sense terminal to said storage transistor for storage by said node capacitance.

26. The device of claim 24 wherein said cells of said array are organized into a plurality of sectors.

27. The device of claim 25 wherein said storage, read and write field effect transistors are insulated gate, P channel enhancement type transistors.

28. An integrated circuit chip for storing binary information signals transferred from a utilization device and for supplying information signals to said utilization device, said chip comprising:

a plurality of dynamic memory cells, each cell including an input means, output means and charge storage means for storing binary information as an electrical charge, said cells being arranged in rows and columns in a matrix defined by a plurality of intersecting digit/sense lines and first and second control lines, each of said cells of a column having said input means connected to the same one of said first control lines and to a different one of said digit/sense lines in common with said output means;

address selection means coupled to said digit/sense lines and said first and second control lines and being responsive to input address signals to provide signals thereto for enabling selectively said cells to apply to said digit/sense lines a data signal representative of said binary information stored by said charge storage means from said output means during a read interval of each memory cycle and to store a data signal applied from said digit/sense line to said input means on said charge storage means during a write interval of each said memory cycle;

data control means including a plurality of storage devices, each device being connected to a common digit/sense line and to said first and second control lines of a different column of said memory cells so as to be selectively enabled each time said column is selected;

read logic means connected to said common digit/-sense line and to said plurality of digit/sense lines; and, write logic means being connected to said common digit/sense line and to said plurality of digit/sense lines in common with said read logic means, said write logic means including means for receiving binary signals from said utilization device;

said read logic means being operative to logically combine a data signal read out to one of said plurality of digit/sense lines from said output means of a memory cell of a column of cells selected by said address selection means during a read interval of said memory cycle in response to a signal being applied to said first control line of said column and a signal read out to said common digit/sense line from said storage device of said column during said read interval to produce an output signal representative of the actual binary information stored by said addressed memory cell for transfer to said utilization device; and, said write logic means during each write cycle of operation being operative to logically combine said signal read from said storage device and said binary signals from said utilization device to produce an output signal representative of the actual binary information to be written into said addressed cell in response to a signal applied to said second control line of said column during said write interval of said memory cycle.

29. The circuit chip of claim 28 wherein said read logic means includes means for performing an exclusive or operation upon said data signal and said signal to produce said output signal.

30. The circuit chip of claim 28 wherein said write logic means includes means for performing a comparison operation upon said signals to produce said output signal.

31. The circuit chip of claim 28 further including:

precharge circuit means connected to said common digit/sense line and to said plurality of digit/sense lines, said precharge circuit means being arranged to charge the capacitance of each of said lines during an interval prior to said read interval;

said memory cells of said selected column and said storage device during said read interval being operative to selectively discharge said capacitance of said digit/sense lines in accordance with the state of said charge storage means to apply said data signal to said digit/sense lines representative of said binary information stored by said cells; and, said memory cells of said selected column and said storage device being operative during said write interval of a read cycle to store a charge representative of the state of said digit/sense lines following said read interval whereby the contents of said memory cells are inverted and refreshed and the contents of said storage device are updated at the end of said memory cycle.

32. The circuit chip of claim 31 wherein each device of said data control means includes a dynamic memory cell similar in construction to said memory cells.

33. The circuit chip of claim 32 wherein each of said cells includes:

storage, read and write field effect transistors, each transistor having source, control and drain electrodes;

said storage transistor being arranged to store digital information by an electrical charge across the node capacitance between said control and source electrodes;

said drain electrodes of said read and write transistors being connected in common to a digit/sense terminal;

said read field effect transistor being connected in series with said storage transistor, said read transistor being arranged to sense the state of said storage transistor when conditioned by a signal applied to said control electrode and to apply a signal representative of said state to said digit/sense terminal; and, said source electrode of said write transistor being connected to said control electrode of said storage transistor, said write transistor being arranged when conditioned by a signal applied to said control electrode to apply a signal representative of the state of said digit/sense terminal to said storage transistor for storage by said node capacitance.

34. The circuit chip of claim 33 wherein said storage, read and write field effect transistors are insulated gate, P channel enhancement type transistors.

35. The circuit chip of claim 28 wherein each of said devices of said data control means includes a memory cell similar in construction to said dynamic memory cells and said chip further includes:

precharge circuit means connected to said common digit/sense line and to said plurality of digit/sense lines, said precharge circuit means being arranged to charge the capacitance of each of said lines during an interval prior to said read interval;

said memory cells of said selected column and said data control cell being operative to selectively discharge said capacitances of said digit/sense lines in accordance with the state of said charge storage means to apply said data signal to said digit/sense lines representative of said binary information stored by said cells; and, said addressed cell of said selected column being operative during said write interval of a write cycle of operation to store a charge representative of said output signal and the remaining cells of said selected column and said data control cell being operative to store a charge representative of the state of said digit/sense lines following said read interval thereby inverting and refreshing the contents of said remaining cells and said data control cell.

36. A store comprising:

a group of cells, each cell operating in one of two allowable states;

an auxiliary cell associated with said group for operating in one of two possible states;

means operative during each read cycle of operation for inverting the state of operation of all of the cells of said group and said auxiliary cell; and, means being responsive to the states of any one of said cells and said auxiliary cell for delivering a signal representative of a first type of binary digit when said states are alike and a signal representative of a second type of binary digit when said states are unlike.

37. The store of claim 36 further including:

input means for supplying an input signal representative of a binary digit of information to be stored in one of the cells of said group; and, writing means during each write cycle of operation being responsive to said signal and to a signal indicative of the state of said auxiliary cell for conditioning said one cell to operate in one of said states when said auxiliary cell state and said input signal have a first relationship and to operate in the other of said states when said auxiliary cell state and said input signal have a second relationship.

38. A method of retrieving stored information from randomly addressable cells within groups of cells of an array, said method comprising the steps of:

a. storing digital control signals representative of two possible states within auxiliary cells associated with different ones of said groups;

b. inverting the states of all of the cells within the group of cells of said addressed cell and said auxiliary cell upon each group addressing; and, c. delivering a signal representative of a first type of binary digit when said states of said addressed cell and said auxiliary cell are alike and a signal representative of a second type of binary digit when said states are unlike.

39. The method of claim 38 wherein the information content of an addressed cell within said array is modified by performing the steps of:

a. supplying an input signal representative of a binary digit of the information to be stored in said addressed cell of said group; and, b. conditioning said addressed cell to operate in one state when states of said auxiliary cell and said input signal have a first relationship and to operate in another state when said states have a second relationship.

* * * * *

UNITED STATES PATENT OFFICE
CERTIFICATE OF CORRECTION

Patent No. 3,786,437 Dated January 15, 1974

Inventor(s) Brian F. Croxon and Laurence F. Abbott

It is certified that error appears in the above-identified patent and that said Letters Patent are hereby corrected as shown below:

Column 25, line 20, delete "singal" and insert --signal--.

Column 29, line 5, delete "on" and insert --or--.

Column 29, line 36, delete "mode" and insert --node--.

Signed and sealed this 11th day of June 1974.

(SEAL)
Attest:

EDWARD M.FLETCHER,JR.
Attesting Officer

C. MARSHALL DANN
Commissioner of Patents